United States Patent
Laroia et al.

(10) Patent No.: US 10,075,651 B2
(45) Date of Patent: Sep. 11, 2018

(54) METHODS AND APPARATUS FOR CAPTURING IMAGES USING MULTIPLE CAMERA MODULES IN AN EFFICIENT MANNER

(71) Applicant: THE LIGHTCO INC., Palo Alto, CA (US)

(72) Inventors: Rajiv Laroia, Far Hills, NJ (US); Sapna A. Shroff, Sunnyvale, CA (US)

(73) Assignee: Light Labs Inc., Palo Alto, CA (US)

( * ) Notice: Subject to any disclaimer, the term of this patent is extended or adjusted under 35 U.S.C. 154(b) by 387 days.

(21) Appl. No.: 14/693,351

(22) Filed: Apr. 22, 2015

(65) Prior Publication Data
US 2016/0309095 A1 Oct. 20, 2016

Related U.S. Application Data

(60) Provisional application No. 62/149,508, filed on Apr. 17, 2015.

(51) Int. Cl.
*H04N 5/247* (2006.01)
*H04N 5/232* (2006.01)
(Continued)

(52) U.S. Cl.
CPC ............ *H04N 5/247* (2013.01); *G06T 7/292* (2017.01); *H04N 5/2257* (2013.01);
(Continued)

(58) Field of Classification Search
None
See application file for complete search history.

(56) References Cited

U.S. PATENT DOCUMENTS

| 4,890,133 | A | 12/1989 | Ogawa et al. |
| 5,078,479 | A | 1/1992 | Vuilleumier |

(Continued)

FOREIGN PATENT DOCUMENTS

| EP | 2642757 A2 | 9/2013 |
| JP | 10091765 | 4/1998 |

(Continued)

OTHER PUBLICATIONS

Segan,S. "Hands on with the 41-Megapixel Nokia PureView 808", Feb. 27, 2012, PC Mag, [online], [retrieved on Apr. 16, 2014]. Retrieved from the Internet: , URL:http://www.pcmag.com/article2/0,2817,2400773,00.asp>, pp. 1-9.

(Continued)

*Primary Examiner* — Eileen M Adams
(74) *Attorney, Agent, or Firm* — Straub & Straub; Michael P. Straub; Stephen T. Straub

(57) ABSTRACT

Methods and apparatus for capturing images using a camera device including multiple camera modules, e.g., multiple optical chains, in an efficient manner are described. Different camera devices in the camera device may capture images corresponding to different size fields of view of a scene area. User input is used to identify an object of interest. A first type camera module having a large field of view is used to track the identified object of interest. Sets of second type camera modules having a smaller field of view are used to capture images of the object of interest. Different sets of second type camera modules may be used at different times as a function of object of interest location. In some embodiments, at least some second type camera modules include the capability to adjust, e.g., move, image capture area, e.g., by changing a mirror angle inclination and/or a mirror rotation.

15 Claims, 21 Drawing Sheets

(51) Int. Cl.
*H04N 5/225* (2006.01)
*G06T 7/292* (2017.01)

(52) U.S. Cl.
CPC ....... *H04N 5/2259* (2013.01); *H04N 5/23216* (2013.01); *H04N 5/23238* (2013.01); *H04N 5/23241* (2013.01)

(56) References Cited

U.S. PATENT DOCUMENTS

| | | |
|---|---|---|
| 5,153,569 A | 10/1992 | Kawamura et al. |
| 5,353,068 A | 10/1994 | Moriwake |
| 5,583,602 A | 12/1996 | Yamamoto |
| 5,781,331 A | 7/1998 | Carr et al. |
| 5,889,553 A | 3/1999 | Kino et al. |
| 5,975,710 A | 11/1999 | Luster |
| 5,982,951 A | 11/1999 | Katayama et al. |
| 6,011,661 A | 1/2000 | Weng |
| 6,028,600 A | 2/2000 | Rosin et al. |
| 6,081,670 A | 6/2000 | Madsen et al. |
| 6,141,034 A | 10/2000 | McCutchen |
| 7,009,652 B1 | 3/2006 | Tanida et al. |
| 7,280,735 B2 | 10/2007 | Thibault |
| 7,315,423 B2 | 1/2008 | Sato |
| 7,551,358 B2 | 6/2009 | Lee et al. |
| 7,561,201 B2 | 7/2009 | Hong |
| 7,801,428 B2 | 9/2010 | Nagaishi et al. |
| 7,810,511 B2 | 10/2010 | Fagrenius et al. |
| 8,144,230 B2 | 3/2012 | Watanabe et al. |
| 8,194,169 B2 | 6/2012 | Tamaki et al. |
| 8,199,222 B2 | 6/2012 | Drimbarean et al. |
| 8,237,841 B2 | 8/2012 | Tanida et al. |
| 8,320,051 B2 | 11/2012 | Matsumura et al. |
| 8,417,058 B2 | 4/2013 | Tardif |
| 8,482,637 B2 | 7/2013 | Ohara et al. |
| 8,520,022 B1 | 8/2013 | Cohen et al. |
| 8,553,106 B2 | 10/2013 | Scarff |
| 8,619,082 B1 | 12/2013 | Cuirea et al. |
| 8,639,296 B2 | 1/2014 | Ahn et al. |
| 8,665,341 B2 | 3/2014 | Georgiev et al. |
| 8,704,944 B1 | 4/2014 | Wierzoch et al. |
| 8,762,895 B2 | 6/2014 | Metha et al. |
| 8,780,258 B2 | 7/2014 | Lee |
| 8,896,655 B2 | 11/2014 | Mauchly et al. |
| 9,041,826 B2 | 5/2015 | Jung et al. |
| 9,104,705 B2 | 8/2015 | Fujinaga |
| 9,135,732 B2 | 9/2015 | Winn et al. |
| 9,282,228 B2 | 3/2016 | Laroia |
| 9,374,514 B2 | 6/2016 | Laroia |
| 2002/0149691 A1 | 10/2002 | Pereira et al. |
| 2003/0018427 A1 | 1/2003 | Yokota et al. |
| 2003/0020814 A1 | 1/2003 | Ono |
| 2003/0185551 A1 | 10/2003 | Chen |
| 2004/0100479 A1 | 5/2004 | Nakano et al. |
| 2004/0227839 A1 | 11/2004 | Stavley et al. |
| 2005/0088546 A1 | 4/2005 | Wang |
| 2005/0200012 A1 | 9/2005 | Kinsman |
| 2005/0232467 A1* | 10/2005 | Mohri ................. G06F 3/0304 382/103 |
| 2006/0067672 A1 | 3/2006 | Washisu et al. |
| 2006/0187338 A1 | 8/2006 | May et al. |
| 2006/0221218 A1 | 10/2006 | Adler et al. |
| 2006/0238886 A1 | 10/2006 | Kushida et al. |
| 2006/0281453 A1 | 12/2006 | Jaiswal et al. |
| 2007/0050139 A1 | 3/2007 | Sidman |
| 2007/0065012 A1 | 3/2007 | Yamakado et al. |
| 2007/0127915 A1 | 6/2007 | Lu et al. |
| 2007/0177047 A1 | 8/2007 | Goto |
| 2007/0182528 A1 | 8/2007 | Breed et al. |
| 2008/0030592 A1 | 2/2008 | Border et al. |
| 2008/0074755 A1 | 3/2008 | Smith |
| 2008/0084484 A1 | 4/2008 | Ochi et al. |
| 2008/0111881 A1 | 5/2008 | Gibbs et al. |
| 2008/0180562 A1 | 7/2008 | Kobayashi |
| 2008/0211941 A1 | 9/2008 | Deever et al. |
| 2008/0219654 A1 | 9/2008 | Border et al. |
| 2008/0240698 A1 | 10/2008 | Bartilson et al. |
| 2008/0247745 A1 | 10/2008 | Nilsson |
| 2008/0251697 A1 | 10/2008 | Park et al. |
| 2008/0278610 A1 | 11/2008 | Boettiger |
| 2009/0086032 A1 | 4/2009 | Li |
| 2009/0136223 A1 | 5/2009 | Motomura et al. |
| 2009/0154821 A1 | 6/2009 | Sorek et al. |
| 2009/0225203 A1 | 9/2009 | Tanida et al. |
| 2009/0278950 A1 | 11/2009 | Deng et al. |
| 2009/0290042 A1 | 11/2009 | Shiohara |
| 2010/0013906 A1 | 1/2010 | Border et al. |
| 2010/0034531 A1 | 2/2010 | Go |
| 2010/0045774 A1 | 2/2010 | Len et al. |
| 2010/0053414 A1 | 3/2010 | Tamaki et al. |
| 2010/0079635 A1 | 4/2010 | Yano et al. |
| 2010/0091089 A1 | 4/2010 | Cromwell et al. |
| 2010/0097443 A1 | 4/2010 | Lablans |
| 2010/0225755 A1 | 9/2010 | Tamaki |
| 2010/0238327 A1 | 9/2010 | Griffith et al. |
| 2010/0265346 A1 | 10/2010 | Iizuka |
| 2010/0283842 A1 | 11/2010 | Guissin et al. |
| 2010/0296802 A1 | 11/2010 | Davies |
| 2011/0051243 A1 | 3/2011 | Su |
| 2011/0063325 A1 | 3/2011 | Saunders |
| 2011/0069189 A1 | 3/2011 | Venkataraman et al. |
| 2011/0080655 A1 | 4/2011 | Mori |
| 2011/0123115 A1 | 5/2011 | Lee et al. |
| 2011/0128393 A1 | 6/2011 | Tavi et al. |
| 2011/0157430 A1 | 6/2011 | Hosoya et al. |
| 2011/0157451 A1 | 6/2011 | Chang |
| 2011/0187878 A1 | 8/2011 | Mor et al. |
| 2011/0193984 A1 | 8/2011 | Kitaya et al. |
| 2011/0221920 A1 | 9/2011 | Gwak |
| 2011/0222167 A1 | 9/2011 | Iwasawa |
| 2011/0242342 A1 | 10/2011 | Goma et al. |
| 2011/0280565 A1 | 11/2011 | Chapman et al. |
| 2011/0285895 A1 | 11/2011 | Weng et al. |
| 2012/0002096 A1 | 1/2012 | Choi et al. |
| 2012/0027462 A1 | 2/2012 | Nozawa |
| 2012/0033069 A1 | 2/2012 | Becker et al. |
| 2012/0062691 A1 | 3/2012 | Fowler et al. |
| 2012/0155848 A1 | 6/2012 | Labowicz et al. |
| 2012/0162464 A1 | 6/2012 | Kim |
| 2012/0188391 A1 | 7/2012 | Smith |
| 2012/0242881 A1 | 9/2012 | Suzuki |
| 2012/0249815 A1 | 10/2012 | Bohn et al. |
| 2012/0257013 A1 | 10/2012 | Witt et al. |
| 2012/0257077 A1 | 10/2012 | Suzuki |
| 2012/0268642 A1 | 10/2012 | Kawai |
| 2013/0027353 A1 | 1/2013 | Hyun |
| 2013/0050564 A1 | 2/2013 | Adams, Jr. et al. |
| 2013/0057743 A1 | 3/2013 | Minagawa et al. |
| 2013/0064531 A1 | 3/2013 | Pillman et al. |
| 2013/0076928 A1 | 3/2013 | Olsen |
| 2013/0086765 A1 | 4/2013 | Chen |
| 2013/0088614 A1 | 4/2013 | Lee |
| 2013/0093842 A1 | 4/2013 | Yahata |
| 2013/0093947 A1 | 4/2013 | Lee et al. |
| 2013/0100272 A1 | 4/2013 | Price et al. |
| 2013/0153772 A1 | 6/2013 | Rossi |
| 2013/0155194 A1 | 6/2013 | Sacre |
| 2013/0194475 A1 | 8/2013 | Okamoto |
| 2013/0222676 A1 | 8/2013 | Ono |
| 2013/0223759 A1 | 8/2013 | Nishiyama |
| 2013/0250125 A1 | 9/2013 | Garrow et al. |
| 2013/0258044 A1 | 10/2013 | Betts-Lacroix |
| 2014/0049677 A1 | 2/2014 | Kawaguchi |
| 2014/0063018 A1 | 3/2014 | Takeshita |
| 2014/0111650 A1 | 4/2014 | Georgiev et al. |
| 2014/0152802 A1 | 6/2014 | Olsson et al. |
| 2014/0192214 A1 | 7/2014 | Laroia |
| 2014/0192224 A1 | 7/2014 | Laroia |
| 2014/0192225 A1 | 7/2014 | Laroia |
| 2014/0192240 A1 | 7/2014 | Laroia |
| 2014/0192253 A1 | 7/2014 | Laroia |
| 2014/0204244 A1 | 7/2014 | Choi et al. |
| 2014/0226041 A1 | 8/2014 | Eguchi et al. |
| 2014/0240579 A1* | 8/2014 | Park ..................... G06F 3/0484 348/333.11 |

(56) References Cited

U.S. PATENT DOCUMENTS

| | | | |
|---|---|---|---|
| 2014/0267243 A1 | 9/2014 | Venkataraman | |
| 2014/0293079 A1 | 10/2014 | Milanfar et al. | |
| 2014/0354714 A1 | 12/2014 | Hirschler et al. | |
| 2015/0029595 A1* | 1/2015 | Swihart | G02B 15/14 359/683 |
| 2015/0035824 A1 | 2/2015 | Takahashi et al. | |
| 2015/0043808 A1 | 2/2015 | Takahashi et al. | |
| 2015/0049233 A1 | 2/2015 | Choi | |
| 2015/0154449 A1 | 6/2015 | Ito et al. | |
| 2015/0156399 A1 | 6/2015 | Chen et al. | |
| 2015/0234149 A1 | 8/2015 | Kreitzer et al. | |
| 2015/0253647 A1 | 9/2015 | Mercado | |
| 2015/0279012 A1 | 10/2015 | Brown et al. | |
| 2016/0091861 A1* | 3/2016 | Liu | H04N 13/0402 359/9 |
| 2016/0142610 A1 | 5/2016 | Rivard et al. | |

FOREIGN PATENT DOCUMENTS

| | | |
|---|---|---|
| JP | 2001061109 | 3/2001 |
| JP | 2007164258 | 6/2004 |
| JP | 2004289214 | 10/2004 |
| JP | 2006106230 | 4/2006 |
| JP | 2007201915 | 8/2007 |
| JP | 2008268937 | 11/2008 |
| JP | 2010049263 | 3/2010 |
| JP | 2010256397 | 11/2010 |
| KR | 100153873 | 7/1998 |
| KR | 1020080022260 | 3/2008 |
| KR | 1020110022279 | 3/2011 |
| KR | 1020130038076 | 4/2013 |

OTHER PUBLICATIONS

Robertson, M et al "Dynamic Range Improvement Through Multiple Exposures". 1999. [online] [retrieved on Apr. 16, 2014]:<URL:http://ieeexplore.ieee.org/xpl/login.jsp?tp=&arnumber=817091&url=http%3A%2F%2Fieeexplore.ieee.org%2Fxpls%2Fabs_all.jsp%3Farnumber%3D817091>, pp. 1-6.
International Search Report from International Application No. PCT/US14/10267, pp. 1-5, dated Jul. 8, 2014.
Written Opinion of the International Searching Authority from International Application No. PCT/US14/10267, pp. 1-29, dated Jul. 8, 2014.
International Search Report and Written Opinion of the International Searching Authority from International Application No. PCT/US2014/061254, pp. 1-29, dated Jan. 8, 2015.
International Search Report and Written Opinion of the International Searching Authority from International Application No. PCT/US2014/061248, pp. 1-11, dated Jan. 13, 2015.
International Search Report and Written Opinion of the International Searching Authority from International Application No. PCT/US2014/061258, pp. 1-14, dated Jan. 13, 2015.
International Search Report and Written Opinion of the International Searching Authority from International Application No. PCT/US2014/061257, pp. 1-12, dated Jan. 14, 2015.
International Search Report and Written Opinion of the International Searching Authority from International Application No. PCT/US2014/062306, pp. 1-12, dated Jan. 26, 2015.
International Search Report and Written Opinion of the International Searching Authority from International Application No. PCT/US2014/063601, pp. 1-12, dated Jan. 27, 2015.
International Search Report and Written Opinion of the International Searching Authority from International Application No. PCT/US2014/072907, pp. 1-11, dated Mar. 27, 2015.

* cited by examiner

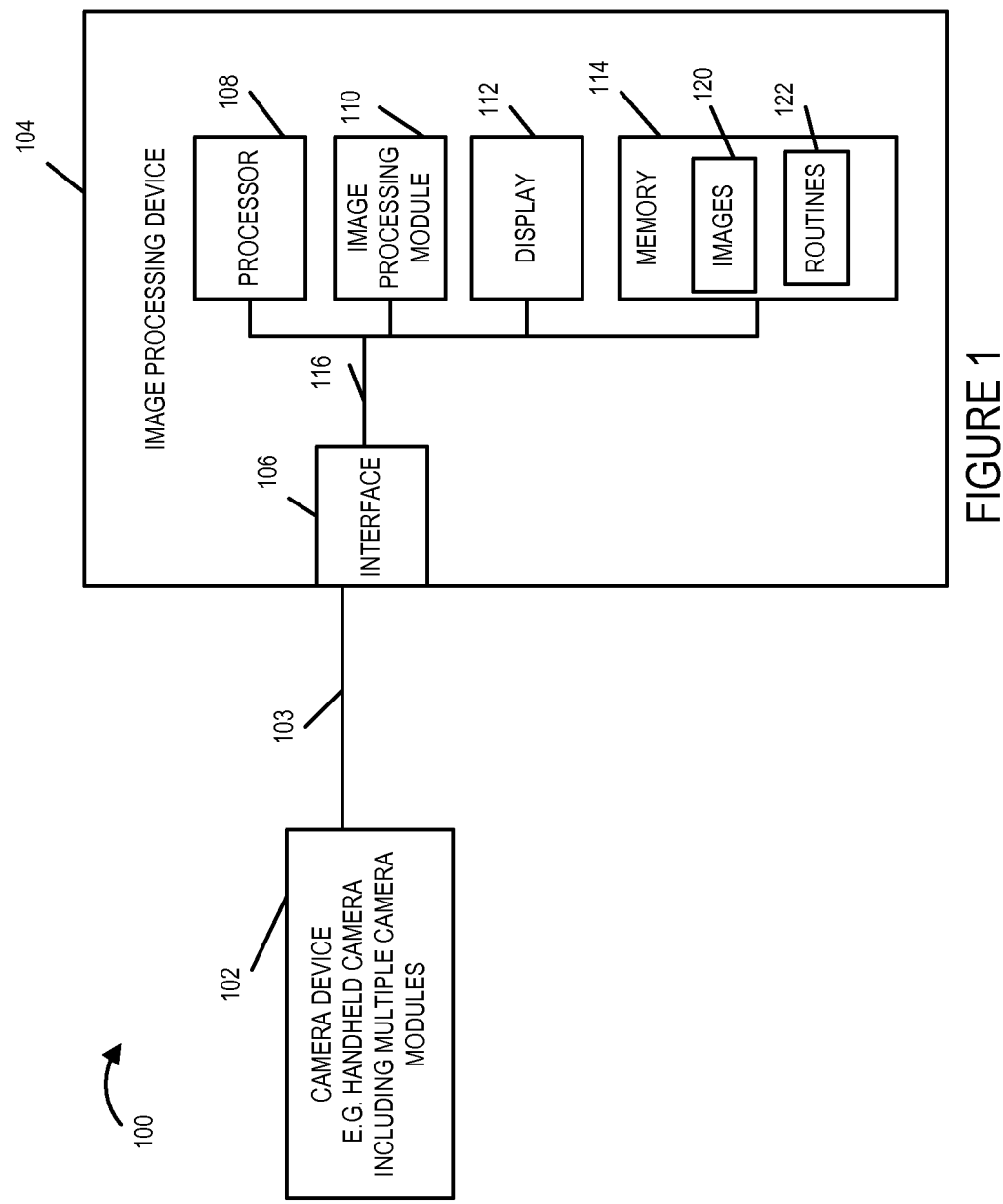

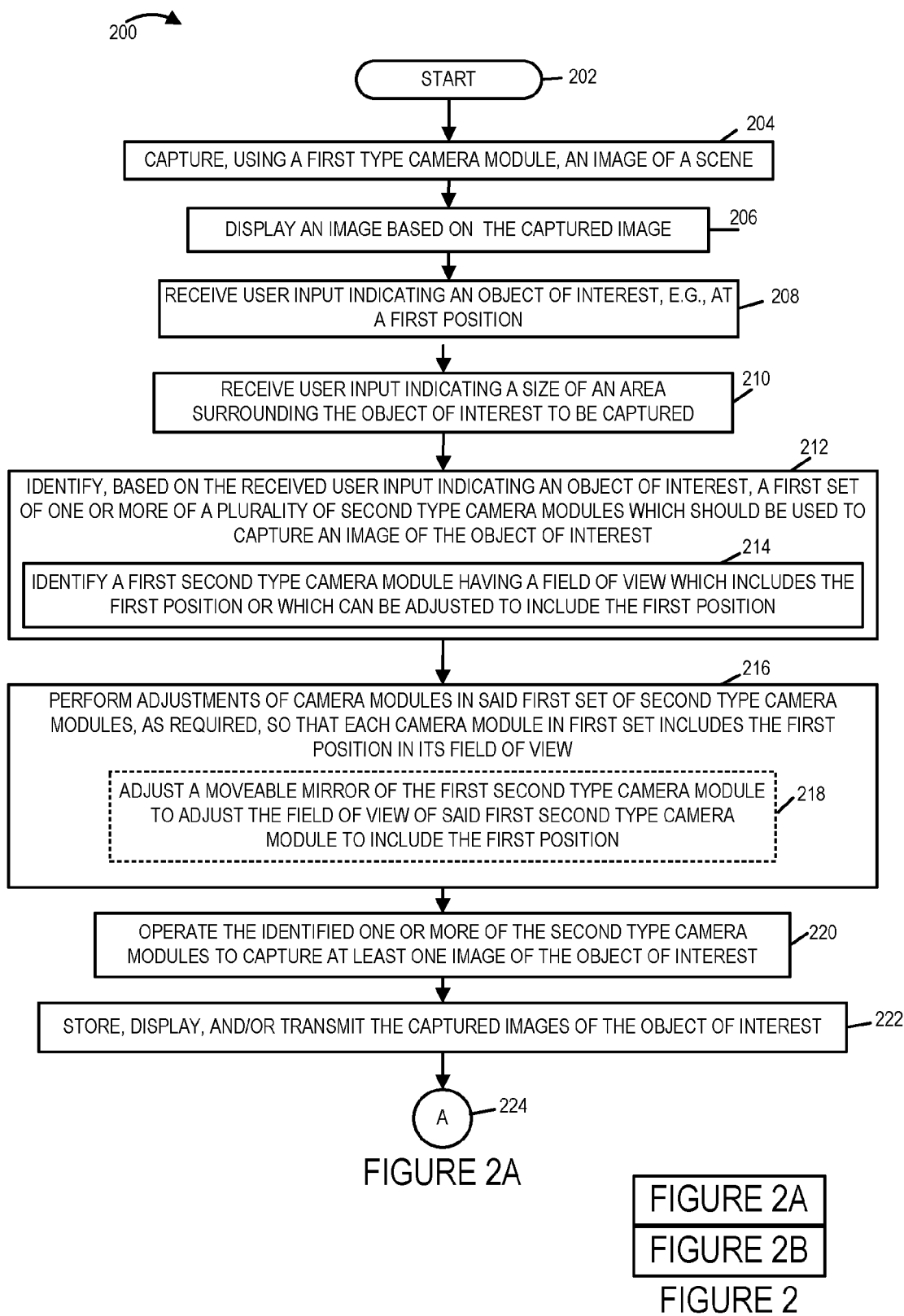

METHODS AND APPARATUS FOR CAPTURING IMAGES USING MULTIPLE CAMERA MODULES IN AN EFFICIENT MANNER

RELATED APPLICATIONS

The present application claims the benefit of U.S. Provisional Patent Application Ser. No. 62/149,508 filed Apr. 17, 2015 which is hereby expressly incorporated by reference in its entirety.

FIELD

The present application relates to capturing images and more particularly, to methods and/or apparatus for capturing images using multiple camera modules in an efficient manner.

BACKGROUND

A camera including multiple camera modules, e.g., optical chains, may offer the possibility of obtaining high quality images, over a similar camera with a single optical chain. It is desirable to include many optical chains to gain advantages from being able to use different focal lengths, having different capture areas, having different resolutions, etc. However, as the number of optical chains increases, the camera can be inefficient in terms of power consumption, processing needs, and data storage needs, e.g., as each additional operated optical chain consumes resources. Increasing battery power, processor capability and memory, to satisfy the needs of operating multiple optical chains can increase weight and/or cost. Based on the above discussion there is a need for new methods and apparatus that allow for operating a camera device including multiple optical chains in an efficient manner.

SUMMARY

A camera device, e.g., a handheld camera with multiple camera modules, is operated to capture images of an object of interest in an efficient manner, e.g., a data and/or power efficient manner. In at least one embodiment the camera device includes camera modules with different fields of view, e.g., at least one first type camera module with a first field of view and one or more second type camera modules. The second type camera modules have a second field of view which is smaller than the first field of view. In some embodiments the first camera modules are implemented with a first focal length, e.g., a 35 mm focal length equivalent to a film camera and the second type camera modules with the second smaller field of view may have a longer focal length, e.g., a 70 mm film equivalent focal length, than the camera modules with the first field of view. In embodiments where the same type of sensors, e.g., sensors with the same pixel count, are used for both the first and second type cameras, the second type cameras capture higher resolution images of a scene area since the captured image corresponds to a smaller scene area than the images captured by the first type camera module with both types of camera modules capturing images with a sensor having the same number of pixel elements in at least one embodiment. In some embodiments, at least four of the second type camera modules are provided to allow for capture of relatively high resolution images of portions of a scene area which can then be combined to generate an image with a higher resolution than that which is captured by the first type camera module. For example, each of four different second type camera modules may capture a quarter of a scene area captured by the first type camera module with the images captured by the second type camera modules being available for combining to generate an image of the scene area which can be captured by the first type camera module with the combined image having, e.g., four times the resolution of the image of the same scene area captured by the first type camera module.

In many cases, a user of the camera device may be interested in capturing an image corresponding to an object or area smaller than the scene are captured by the first type camera module. For example, a user may desire to capture an object and surrounding area which is equal to or smaller than the scene area which can be captured by a second type camera module. In such a case, it may be possible to capture the object of interest using a single one of the second type camera modules. However, this will depend on the location of the object of interest in the overall scene area.

Furthermore, in the case of video the location of the object may change with time increasing the chance that the object of interest will move out of the field of view of one of the second type cameras and into the field of view of another one of the second type cameras.

One approach to making sure that the object and scene area of interest is captured at the resolution possible by using the second type camera modules is to operate all the second type camera modules in parallel to make sure that the object and associated area of interest is captured as long as it remains in the combined overall field of view of the second type camera modules which, in some embodiments corresponds to the field of view of the first type camera module. While using all the second type camera modules in parallel is used in some embodiments, such an approach can consume significant power and data storage resources since it may involve operating all the second type cameras and also possibly operation of the first type camera to capture an image to facilitate combining of the image portions captured by the second type cameras.

In at least some embodiments, rather than operate all the available second type cameras in parallel, an automated decision is made as to which second type camera module or modules to operate at a given time is made based on user identification of an object of interest and, optionally, the size of the area of interest surrounding the identified object of interest. For example a user may touch a screen displaying an image of the scene area corresponding to the combined field of view of the second type camera modules and then circle, spread their fingers and/or otherwise indicate the desired size of the area to be captured surrounding the object of interest. In some embodiments the displayed image used for purposes of allowing a user to indicate an object and/or area of interest is captured by a first type camera module which captures the scene area corresponding to the combined field of view of the plurality of second type camera modules.

Based on the location in the scene of the user indicated object of interest and/or size of the user indicated area of interest to capture a control module determines which one or ones of the second type camera modules is to be used at any given time to capture the object of interest. At least one first type camera module is used in some but not all embodiments to capture an image of the overall scene area while the determined second type camera module or modules are used to capture the object of interest and surrounding area of interest. In the case of video, the location of the object of interest is tracked based on the image, e.g., low resolution image, captured by the first type camera module. As a change in the position of the object of interest is detected during a video capture, a new decision is made as to which of the second type module or modules should be used to capture the image and/or the position of the field of view of a second type of camera module in the scene area is changed so that the object of interest and surrounding area of interest continues to be captured despite movement of the object of interest.

In some embodiments, for example, as an object of interest is detected to move from a quadrant of the scene area covered by a first one of said second type camera modules to a quadrant covered by a second one of said second type camera modules, the control module switches from using the first second type camera module to using the second second type camera module. While the object passes across the scene area boundary corresponding to the first and second second type camera modules both may be used to capture images but once the object and scene area of interest is fully within the area corresponding to the second second type camera module image capture by the first second type camera module will cease thus conserving power and memory since the first second type camera module will be powered down and no longer outputting images which need to be stored. However image capture will continue using the second second type camera module covering the area of the scene in which the object of interest is located.

Accordingly, it should be appreciated that by using the image output by the first type camera module to allow tracking of an object of interest second type camera modules can be switched on and off as needed to ensure capture of the object and corresponding area of interest but with one or more second type camera modules not needed to capture the object and corresponding area of interest being idled thereby conserving power, memory and processing resources.

In some embodiments the second type camera modules include movable mirrors. In one such embodiment based on object tracking information the portion of the scene area captured by the second type camera module is controlled based on tracking of the object of interest by moving a mirror which is part of the second type camera module. By moving a mirror of a camera module, the need to switch between camera modules is reduced as compared to the case where the camera modules do not include movable mirrors. While in some embodiments the mirrors of the second type camera modules can move along one axis in other embodiments one or more second type camera modules can be moved in two axis allowing the camera modules mirror to be adjusted as the object of interest moves in either the X or Y direction relative to the front of the camera including the first and second type camera modules.

In view of the above it should be appreciated that while multiple second type modules are included in a camera device, a subset of the second type camera modules is used during some periods of time with the modules being used depending on the position of the user indicated object of interest in the camera devices overall field of view. In some embodiments, the object of interest and surrounding area is captured using a portion of a sensor of an identified second type camera module. In some such embodiments, a first portion of the identified second type camera module's sensor, which should capture the identified object of interest and identified surrounding area, is controlled to be ON, and a second portion of the second type camera module's sensor, is controlled to be OFF, said second portion being non-overlapping with the first portion.

Numerous variations on the above described methods and apparatus are possible with the number of first and second type modules varying depending on the particular embodiment. While the invention has been described in the context of first and second type camera modules, in some embodiments the camera device includes additional camera modules, e.g., third type camera modules corresponding to a different focal length. While the first and second type camera modules have different focal lengths in some embodiments, it is not necessary for the first type camera module to correspond to the smallest focal length camera module in the camera although such an approach may be useful where the object of interest may move by an amount greater than the length or height of the camera modules with the next smallest focal length to avoid the risk that the object of interest moves beyond an area which can be easily monitored based on the output of a single camera module.

An exemplary method of operating a camera device, in accordance with various embodiments, includes: receiving user input indicating an object of interest; identifying, based on the received user input, a first set of one or more of a plurality of second type camera modules which should be used to capture an image of the object of interest; and operating the identified one or more of the second type camera modules to capture at least one image of the object of interest. An exemplary camera device, in accordance with some embodiments, includes: a plurality of camera modules, e.g., optical chains; a module configured to receive user input indicating an object of interest; a module configured to identify, based on the received user input, a first set of one or more of a plurality of second type camera modules which should be used to capture an image of the object of interest; and a module configured to control the identified one or more of the second type camera modules to capture at least one image of the object of interest.

While many embodiments and features have been discussed in the above summary, it should be appreciated that many of the novel features described herein can be used independent of other novel features. Thus while various exemplary embodiments have been described, the application is not limited to the particular exemplary embodiments or combinations of features described in particular exemplary embodiments.

Numerous additional features and embodiments are described in the detailed description which follows.

BRIEF DESCRIPTION OF THE DRAWINGS

FIG. 1 illustrates a camera system including a camera device and an image processing device in accordance with the present invention.

FIG. 2A is a first part of a flowchart of an exemplary method of operating a camera device or a camera system including a camera device and an image processing device in accordance with an exemplary embodiment.

FIG. 2 comprises the combination of FIG. 2A and FIG. 2B.

DETAILED DESCRIPTION

Figure 2B:
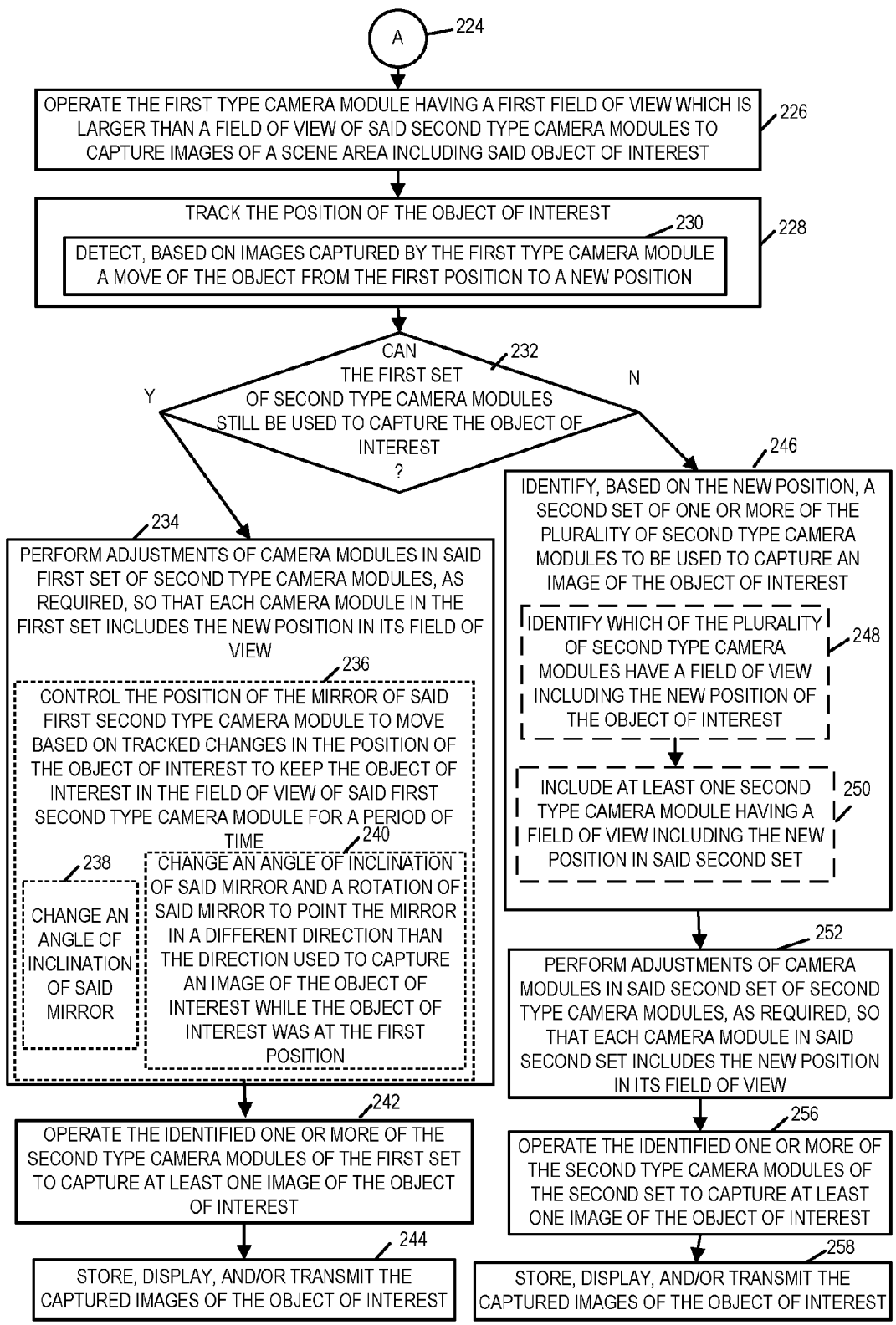
FIG. 2B is a second part of a flowchart of an exemplary method of operating a camera device or a camera system including a camera device and an image processing device in accordance with an exemplary embodiment.

FIG. 1 illustrates a camera system 100 including a camera device 102 and an image processing device 104 which can be used in accordance with the present invention. The camera device 102 may be the same or similar to the camera 300 shown in FIG. 3. The camera device 102 is coupled to the image processing device 104 via a communications link 103 which may be a wireless link, network link or wired link such as a USB cable. Image processing device 104 may be a personal computer or network node, such as a cloud server, capable of receiving images from the camera device 102, processing said images, and sending one or more control signals to the camera device 102. The image processing device 1004 includes an interface 106 with which it can receive from, and send data and/or other information to the camera device 102. The image processing device 104 includes interface 106 that is coupled via bus 116 to a processor 108, image processing module 110, display 112 and memory 114. The various elements coupled to the bus 116 can communicate over the bus with each other and via interface 106 with external elements including the camera device 102 and other network elements which can communicate with the image processing device via a network and interface 106. The processor 108 can and does receive and processes images from the camera device 102. Processing can include, e.g., identifying sets of camera modules to use to capture images, tracking an object of interest, camera device control including determining mirror adjustments and/or changes, composite image generation, and/or image storage in accordance with the steps of the method shown in FIG. 2. The memory 114 includes images, e.g., received images and generated composite images and one or more routines 122 which control the image processing device to implement the steps of the methods of the invention including the image processing steps shown in FIG. 2. As should be appreciated the functionally described with respect to FIG. 2 can be split between the camera device 102 and image processing device 104 in any of a variety of ways with the processor of the camera device 102 performing some functions and the processor of the image processing device 104 performing other functions. Image processing module 110 may be and sometimes is implemented as a dedicated image processing circuit responsible for generating the depth map and/or composite image in a hardware circuit. In some embodiments modules are implemented fully in hardware, e.g., as a circuit or combination of circuit and optical elements.

From the above it should be appreciated that the camera system implementing the method of FIG. 2 can be implemented in a single camera device, e.g., a portable handheld camera or can be implemented in a distributed manner with the camera device capturing images and various image processing operations being performed using hardware, e.g., a personal computer or network node, to perform one or more image processing operations outside the camera device.

FIG. 2 is a flowchart 200 of an exemplary method of operating a camera device or a camera system including a camera device and an image processing device, in accordance with various exemplary embodiments. The flowchart of FIG. 2 will be explained for an example in which each of the steps of flowchart 200 is performed by a camera device.

The exemplary camera device includes a plurality of camera modules, e.g., optical chain modules. Operation starts in step 202 in which the camera device is powered on and initialized. Operation proceeds from step 202 to step 204. In step 204 the camera device captures, using a first type camera module, an image of a scene. Operation proceeds from step 204 to step 206. In step 206, the camera device displays an image based on the captured image, e.g., on a touch screen display. Operation proceeds from step 206 to step 208, in which the camera device receives user input indicating an object of interest, e.g., at a first position in the displayed image. In some embodiments, received user input is an indication that a user has touched a particular point on a touch screen display, e.g., corresponding to an object of interest, which is displaying the captured image which includes the object of interest. In some embodiments, received user input is an indication that a user has identified a particular point on a display which is displaying a scene area corresponding to a captured image, e.g., by moving a target object identifier on top of the object of interest. Operation proceeds from step 208 to step 210.

In step 210 the camera device receives user input indicating a size of an area surrounding the object of interest to be captured. In some embodiments, the received user input is via touch on a touch screen, e.g., a user spreading a pair of fingers beyond the object of interest to identify boundaries for the size of the area surrounding the object of interest to be captured. In some embodiments, the area surrounding the object of interest to be captured is a rectangular shaped box. In other embodiments, the area surrounding the object of interest to be captured is a circular shaped region. In some embodiments, the indicated area is one of a plurality of predetermined alternative size selections. In some embodiments, the area is an irregular shaped area which extends beyond the object of interest by at least a predetermined amount in each direction. In some embodiments, the user selects from a menu of alternative area size and/or area shape alternative. In some embodiments, the user selects a surrounding area size corresponding to the object in the currently displayed image. In some such embodiments, the user can select an object for automatic surrounding area adjustment, e.g., the area surrounding the image is automatically adjusted if the object of interest changes in size in the image over time, e.g., due to a change in distance of the object of interest from the camera device. Operation proceeds from step 210 to step 212.

In step 212 the camera device identifies, based on the received user input indicating an object of interest, a first set of one or more of a plurality of second type camera modules which should be used to capture an image of the object of interest. In some embodiments, identifying a first set of one or more of a plurality of second type camera modules which should be used to capture an image of the object of interest is further based on the size of the area surrounding the object of interest to be captured. Step 212 includes step 214 in which the camera device identifies a first second type camera module having a field of view which includes the first position or which can be adjusted to include the first position. Operation proceeds from step 212 to step 216.

In step 216 the camera device performs adjustments of camera modules in said first set of second type camera modules, as required, so that each camera module in the first set includes the first position in its field of view. In some embodiments, the first second type camera module is a camera module with a moveable mirror. In some embodiments, step 216 includes step 218 in which the camera device adjusts a moveable mirror of the first second type camera module to adjust the field of view of said first second type camera module to include the first position. In some embodiments, the first set does not include any camera modules with moveable mirrors and step 218 is not performed.

Operation proceeds from step 216 to step 220. In step 220 the camera device operates the identified one or more of the second type camera modules to capture at least one image of the object of interest. In some embodiments, in step 220, an identified second type camera module capturing an image of an object of interest may, and sometimes does, capture the image using a first portion of its sensor which is controlled to be powered on, and does not use a second portion of its sensor which is controlled to be powered off. In various embodiments, in step 220, the camera device further controls second type camera modules which are not being used to capture an image of the object of interest to be powered down, e.g., second type camera modules not included in the first set are controlled to be powered down. Operation proceeds from step 220 to step 222 in which the camera device stores, displays and/or transmits the captured images of the object of interest. In some embodiments, the camera device generates a combined image based on the captured images received from one of more second type camera modules in the first set and stores, displays and/or transmits the combined image.

Operation proceeds from step 222, via connecting node A 224, to step 226. In step 226 the camera device operates the first type camera module having a first field of view, which is larger than a field of view of said second type camera modules, to capture images of a scene area including said object of interest. Operation proceeds from step 226 to step 228.

In step 228 the camera device tracks the position of the object of interest. Step 228 includes step 230 in which the camera device detects, based on the images captured by the first type camera module, a move of the object of interest from the first position to a new position. Operation proceeds from step 228 to step 232.

In step 232 the camera device determines if the first set of second type camera modules can still be used to capture the object of interest. If the camera device determines that the first set of second type camera modules can still be used to capture the object of interest, then operation proceeds from step 232 to step 234. However, if the camera device determines that the first set of second type camera modules can no longer be used to capture the object of interest, then operation proceeds from step 232 to step 246.

Returning to step 234, in step 234 the camera device performs adjustments of camera modules in said first set of second type camera modules as required, so that each camera module in the first sect of second type camera modules includes the new position of the object of interest in its field of view. In some embodiments, step 234 includes step 236, in which the camera device control the position of the mirror of said first second type camera module to move based on the tracked changes in the position of the object of interest to keep the object of interest in the field of view of said first second type camera module for a period of time. In various embodiments, step 236 includes one of step 238 and 240. In step 238 the camera device changes an angle of inclination of said mirror of said first second type camera module. In step 240 the camera device changes an angle of inclination of said mirror and a rotation of said mirror to point said mirror of said first second type camera module in a different direction than the direction used to capture an image of the object of interest while the object of interest was at the first position.

Operation proceeds from step 234 to step 242. In step 242 the camera device operates the identified one or more of the second type camera modules of the first set to capture at least one image of the object of interest. In some embodiments, in step 242, an identified second type camera module capturing an image of an object of interest may, and sometimes does, capture the image using a first portion of its sensor which is controlled to be powered on, and does not use a second portion of its sensor which is controlled to be powered off. In various embodiments, in step 242, the camera device further controls second type camera modules which are not being used to capture an image of the object of interest to be powered down, e.g., second type camera modules not included in the first set are controlled to be powered down. Operation proceeds from step 242 to step 244 in which the camera device stores, display, and/or transmits the captured images of the object of interest. In some embodiments, the camera device generates a combined image based on the captured images received from one of more second type camera modules in the first set and stores, displays and/or transmits the combined image.

Returning to step 246, in step 246, the camera device identifies, based on the new position, a second set of one or more of the plurality of second type camera modules to be used to capture an object of interest. The second set of second type camera modules is different than the first set of second type camera modules. Each module of the second set of second type camera modules has a field of view which includes the new position of the object of interest or has a field of view which can be adjusted to include the new position of the object of interest. In some embodiments, step 246 includes steps 248 and 250. In step 248 the camera device identifies which of the plurality of second type camera modules have a field of view including the new position of the object of interest. Operation proceeds from step 248 to step 250. In step 250 the camera device includes at least one second type camera module having a field of view including the new position in the second set.

Operation proceeds from step 246 to step 252. In step 252 the camera device performs adjustments of camera modules in said second set of camera modules, as required, so that each camera in said second set includes the new position in its field of view. Operation proceeds from step 252 to step 256 in which the camera device operates the identified one or more of the second type camera modules in said second set to capture at least one image of the object of interest. In some embodiments, in step 256, an identified second camera module capturing an image of an object of interest may, and sometimes does, capture the image using a first portion of its sensor which is controlled to be powered on, and does not use a second portion of its sensor which is controlled to be powered off. In various embodiments, in step 256, the camera device further controls second type camera modules which are not being used to capture an image of the object of interest to be powered down, e.g., second type camera modules not included in the second set are controlled to be powered down. Operation proceeds from step 256 to step 258. In step 258, the camera device stores, display, and/or transmits the captured images of the object of interest. In some embodiments, the camera device generates a combined image based on the captured images received from one of more second type camera modules in the second set and stores, displays and/or transmits the combined image.

Figure 3:
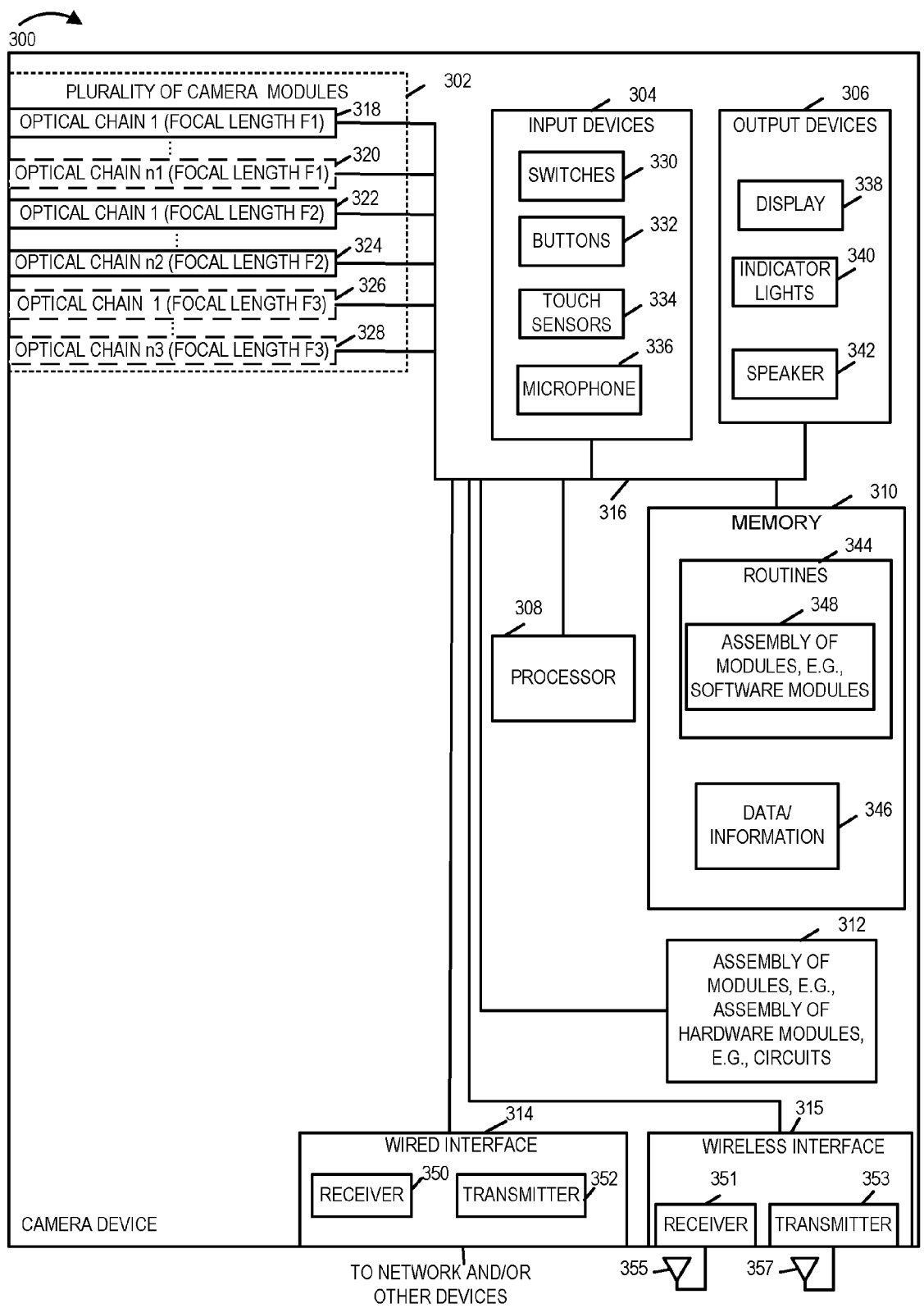
FIG. 3 illustrates a camera device implemented in accordance with one embodiment of the present invention.

FIG. 3 is a drawing of an exemplary camera device 300 in accordance with an exemplary embodiment. In various embodiments, camera device 300 is a portable handheld device. Exemplary camera device 300 includes a plurality of camera modules, e.g., optical chain modules, at least some of the plurality of camera modules have different fields of view. Each camera module, e.g., optical chain, includes an aperture, one or more lenses, and an image sensor. In some embodiments, some or all of the camera modules include a mirror. In various embodiments, some of the camera modules include a mirror which can be tilted. In some embodiments, some of the camera modules include a mirror which can be tilted and rotated. In some embodiments, the plurality of camera modules includes a 35 mm camera module, e.g., a first type camera module, and a plurality of 75 mm camera modules, e.g., second type camera modules. In some embodiments, the plurality of camera modules includes one or more 35 mm camera modules, e.g., a first type camera module, and a plurality of 75 mm camera modules, e.g., second type camera modules, and a plurality of 150 mm camera modules, e.g., third type camera modules. In various embodiments, the camera device 300 includes at least one first type camera module and at least two second type camera modules. In some such embodiments, the camera device 300 includes at least one first type camera module and at least four second type camera modules. In various embodiments, the field of view of a first type camera module is larger than the field of view of a second type camera module. In various embodiments, at least some of the second type camera modules include a moveable mirror.

Exemplary camera device 300 includes a plurality of camera modules 302, which includes: one or more optical chains with focal length F1 (optical chain 1 with focal length F1 318, . . . , optical chain n1 with focal length F1 320), a plurality of optical chains with focal length F2 (optical chain 1 with focal length F2 322, . . . , optical chain n2 with focal length F2 324), and, in some embodiments, a plurality of optical chains with focal length F3 (optical chain 1 with focal length F3 326, . . . , optical chain n3 with focal length F3 328), where focal length F1, focal length F2, and focal length F3 are different values. In various embodiments, F1<F2<F3. In various embodiments, the field of view of the a camera module with focal length F1 is larger than a field of view of camera module with focal length F2, and the field of view of a camera module with focal length F2 is larger than a field of view of a camera module with focal length F3. In some embodiments, modules (318, . . . , 320) are considered first type camera modules, modules (322, . . . , 324) are considered second type camera modules, and modules (326, . . . , 328) are considered third type camera modules.

Camera device 300 further includes input devices 304, output devices 306, a processor 308, e.g., a CPU, memory 310, assembly of modules 312, e.g., an assembly of hardware modules such as an assembly of circuits, a wired interface 314, and a wireless interface 315. Input devices 304 include switches 330, buttons 332, touch sensor 334, and a microphone 336. Received input via an input device includes input indicating a user selection of an object of interest and input indicating a size of an area surrounding an object of interest to be captured. Output devices 306 include a display 338, indicator lights 340, and a speaker 342. In some embodiments, the display 338 is a touch screen display which serves as both an output device for displaying an image and an input device for receiving input. Memory 310 includes routines 344 and data/information 346. Routines 344 include an assembly of modules 348, e.g., an assembly of software modules. Data/information 346 includes, stored captured images from the camera modules, information identifying objects of interest, tracking information, information indicating identified sets of second type camera modules to use to capture images, generated composite images, user selected information, camera module characteristic information, control information, e.g. current mirror position information, and mirror adjustment information.

Wired interface 314 includes a receiver 350 and a transmitter 352, e.g., for communicating with other devices, e.g., via a network and/or the Internet. In some embodiments, captured images from individual camera modules and/or generated composite images are communicated to other devices via wired interface 314. Wireless interface 315 includes a wireless receiver 351 coupled to receive antenna 355 and a wireless transmitter 352 coupled to transmit antenna 357, e.g., for communicating with other devices including a wireless interface. In some embodiments, captured images from individual camera modules and/or generated composite images are communicated to other devices via wireless interface 315.

Optical chains in plurality of camera modules 302, input devices 304, output devices 306, processor 308, memory 310, assembly of modules 212, wired interface 314 and wireless interface 314 are coupled together via a bus 316 over which the various elements may interchange data and information.

Figures 4, 4A:
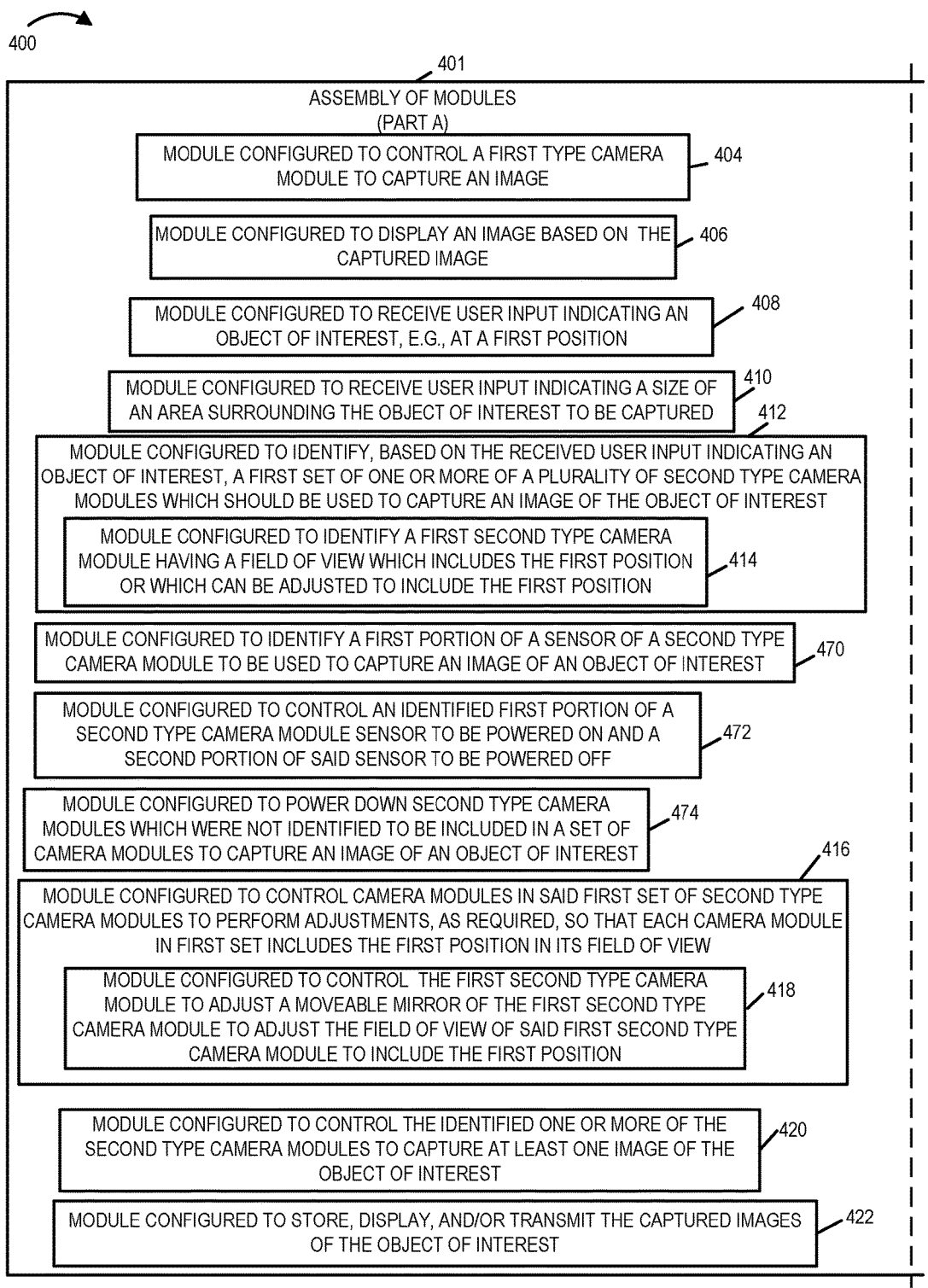
FIG. 4A is a first part of an assembly of modules, which may be included in a camera device, in accordance with an exemplary embodiment.
FIG. 4 comprises the combination of FIG. 4A and FIG. 4B.
Figure 4B:
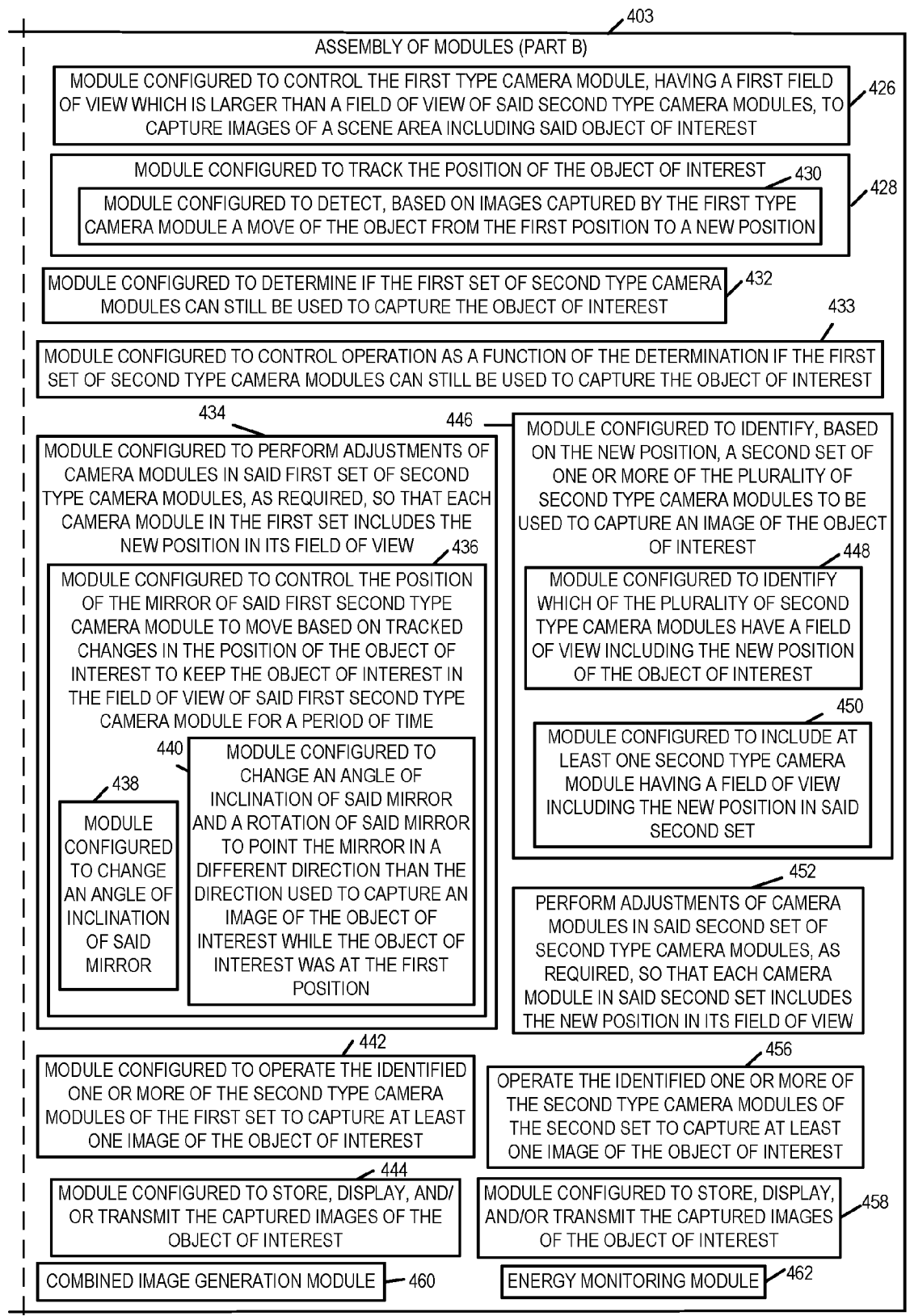
FIG. 4B is a second part of an assembly of modules, which may be included in a camera device, in accordance with an exemplary embodiment.

FIG. 4, comprising the combination of FIG. 4A and FIG. 4B, is a drawing of an assembly of modules 400, comprising the combination of Part A 401 and Part B 403. Assembly of modules 400 may be included in a camera device implemented in accordance with the present invention, e.g., camera device 300 of FIG. 3. Alternatively, assembly of modules 400 may be included in a camera system, e.g. camera system 100 of FIG. 1 including camera device 102 and image processing device 104 with some modules in assembly of modules 400 being included in each device (102, 104). Assembly of modules 400 may implement steps of a method, e.g., steps of the method of flowchart 200 of FIG. 2. In some embodiments, assembly of modules 400 is an assembly of circuits, which may be coupled together. In one exemplary embodiment, assembly of modules 400 is assembly of modules 312 of camera 300 of FIG. 3. In some embodiments, the assembly of module 400 is an assembly of software modules. In one exemplary embodiment, assembly of modules 400 is assembly of modules 348 of memory 310 of camera 300 of FIG. 3. The modules in the assembly of modules 400 can, and in some embodiments are, implemented fully in hardware within the processor 308, e.g., as individual circuits. The modules in the assembly of modules 400 can, and in some embodiments are, implemented fully in hardware within the assembly of modules 312, e.g., as individual circuits corresponding to the different modules. In other embodiments some of the modules are implemented, e.g., as circuits, within the processor 308 with other modules being implemented, e.g., as circuits within assembly of modules 312, external to and coupled to the processor. As should be appreciated the level of integration of modules on the processor and/or with some modules being external to the processor may be one of design choice.

Alternatively, rather than being implemented as circuits, all or some of the modules in assembly of modules 400 may be implemented in software and stored in the memory 310 of the camera device 300, with the modules controlling operation of camera device 300 to implement the functions corresponding to the modules when the modules are executed by a processor, e.g., processor 308. In some such embodiments, the assembly of modules 400 is included in the memory 310 as assembly of modules 348. In still other embodiments, various modules in assembly of modules 400 are implemented as a combination of hardware and software, e.g., with another circuit external to the processor providing input to the processor 308 which then under software control operates to perform a portion of a module's function. While shown in the FIG. 3 embodiment as a single processor, e.g., computer, it should be appreciated that the processor 308 may be implemented as one or more processors, e.g., computers.

When implemented in software the modules include code, which when executed by the processor 308, configure the processor 308 to implement the function corresponding to the module. In embodiments where the assembly of modules 400 is stored in the memory 310, the memory 310 is a computer program product comprising a computer readable medium comprising code, e.g., individual code for each module, for causing at least one computer, e.g., processor 308, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 4 control and/or configure the camera device 300 elements therein such as the processor 308, to perform functions of the corresponding steps illustrated in the method flowchart 200 of FIG. 2. Thus the assembly of modules 400 includes various modules that perform functions of the corresponding steps of the method shown in FIG. 2.

Assembly of modules 400 includes a module 404 configured to control a first type camera module to capture an image, a module 406 configured to display an image based on the captured image from module 404, a module 408 configured to receive user input indicating an object of interest, e.g., at a first position, and a module 410 configured to receive user input indicating a size of an area surrounding the object of interest to be captured.

Assembly of modules 400 further includes a module 412 configured to identify, based on the received user input indicating an object of interest, a first set of one or more of a plurality of second type camera modules which should be used to capture an image of the object of interest. In some embodiments, module 412 is further configured to base the identification of the first set of one or more of a plurality of second type camera modules, which should be used to capture the object of interest, on the size of the area surrounding the object of interest to be captured. Module 412 includes a module 414 configured to identify a first second type camera module having a field of view which includes the first position or which can be adjusted to include the first position. In various embodiments, module 414 is configured to identify a first second type camera module having a field of view which includes identified object of interest and the identified surrounding area or which can be adjusted to include the identified object of interest and the identified surrounding area. Assembly of modules 400 further includes a module 416 configured to control camera modules in said first set of second type camera modules to perform adjustments, as required, so that each camera module in the first set of second type camera modules includes the first position in its field of view. Module 416 includes module 418 configured to control the first second type camera module to adjust a moveable mirror of the first second type camera module to adjust the field of view of said first second type camera module to include the first position. Assembly of modules 400 further includes a module 420 configured to control the identified one or more of the second type camera modules to capture at least one image of the object of interest, and a module 422 configured to store, display and/or transmit the captured images of the object of interest and/or one or more combined images based on captured images from multiple camera modules.

Assembly of modules 400 further includes a module 426 configured to control the first type camera module, having a first field of view which is larger than a field of said second type camera modules, to capture images of a scene area including said object of interest, and a module 428 configured to track the position of the object of interest. Module 428 includes a module 430 configured to detect, based on images captured by the first type camera module, a move of the object of interest from the first position to a new position. Assembly of module 400 further includes a module 432 configured to determine if the first set of second type camera modules can still be used to capture the object of interest and module 433 configured to control operation as a function of the determination if the first set of second type modules can still be used to capture the object of interest.

Assembly of modules 400 further includes a module 434 configured to perform adjustments of camera modules in said first set of second type camera modules, as required, so that each camera module in the first set includes the new position in its field of view. Module 434 includes a module 436 configured to control the position of the mirror of said first second type camera module to move based on tracked changes in the position of the object of interest to keep the object of interest in the field of view of said first second type camera module for a period of time. Module 436 include one or both of a module 438 configured to change an angle of inclination of said mirror and a module 440 configured to change an angle of inclination of said mirror and a rotation of said mirror to point the mirror in a different direction than the direction used to capture an image of the object of interest which the object of interest was at the first position. Assembly of modules 400 further includes a module 442 configured to operate the identified one or more of the second type camera modules of the first set to capture at least one image of the object of interest and a module 444 configured to store, display, and/or transmit the captured images of the object of interest, e.g., captured by the first set of second type modules.

Assembly of modules 400 further includes a module 446 configured to identify, based on the new position, a second set of one or more of the plurality of second type camera modules to be used to capture an image of the object of interest. In various embodiments, the second set is different from the first set. Module 446 includes a module 448 configured to identify which of the plurality of second type camera modules have a field of view including the new position of the object or interest, and a module 450 configured to include at least one second type camera module having a field of view including the new position in said second set. In some embodiments, module 446 includes a module configured to identify which of the plurality of second type camera modules have a field of view including the new position of the object interest or which can be adjusted to include the new position of the object of interest and a module configured to include at least one second type camera module having a field of view including the new position or which can be adjusted to include the new position in said second set. Assembly of modules 400 further includes a module 462 configured to perform adjustments of camera modules in said second set of second type camera modules, as required, so that each camera module in said second set includes the new position of the object of interest in its field of view. Assembly of modules 400 further includes a module 456 configured to operate the identified one or more of the second type camera modules of the second set to capture at least one image of the object of interest, and a module 458 configured to store, display, and/or transmit the captured images of the object of interest, e.g., captured by the second set of second type modules.

In various embodiments, assembly of modules 400 includes a combined image generation module 460 configured to generate a combined image from images based on images captured by a set of second type camera modules, and modules 444 and 458 are further configured to store, display, and/or transmit a generated combined image.

In some embodiments, assembly of modules 400 includes an energy monitoring module 462 configured to monitor the battery, monitor energy used, and estimate remaining available stored battery energy. In some embodiments, the amount of second type modules included in a set, e.g., selected to be included a first or second set, is a function of remaining battery power, e.g., with less camera modules being powered on and used to capture image when a low battery level is detected. In some embodiments, assembly of modules 400 further includes a module 470 configured to identify a first portion of a sensor of a second type camera module to be used to capture an object of interest and a module 472 configured to control an identified first portion of a second type camera module to be powered on and to control a second portion of said sensor to be powered off. Thus, in some embodiments, the full capture capability of an identified second type camera module is not utilized, e.g., because the area of interest including the identified object of interest and the identified surrounding area to be captured is smaller than the camera module's capability and deactivating capture on a portion of the camera module saves energy, capture time, and/or memory storage. In some embodiments, assembly of modules 400 further includes a module 474 configured to power down second type camera modules which were not identified to be included in a set of camera modules which were identified to be used to capture an object of interest, e.g., at one time second type camera modules which were not in the identified first set are controlled to be powered down or at another time second type camera modules which were not included in the identified second set are controlled to be powered down.

Figure 5:
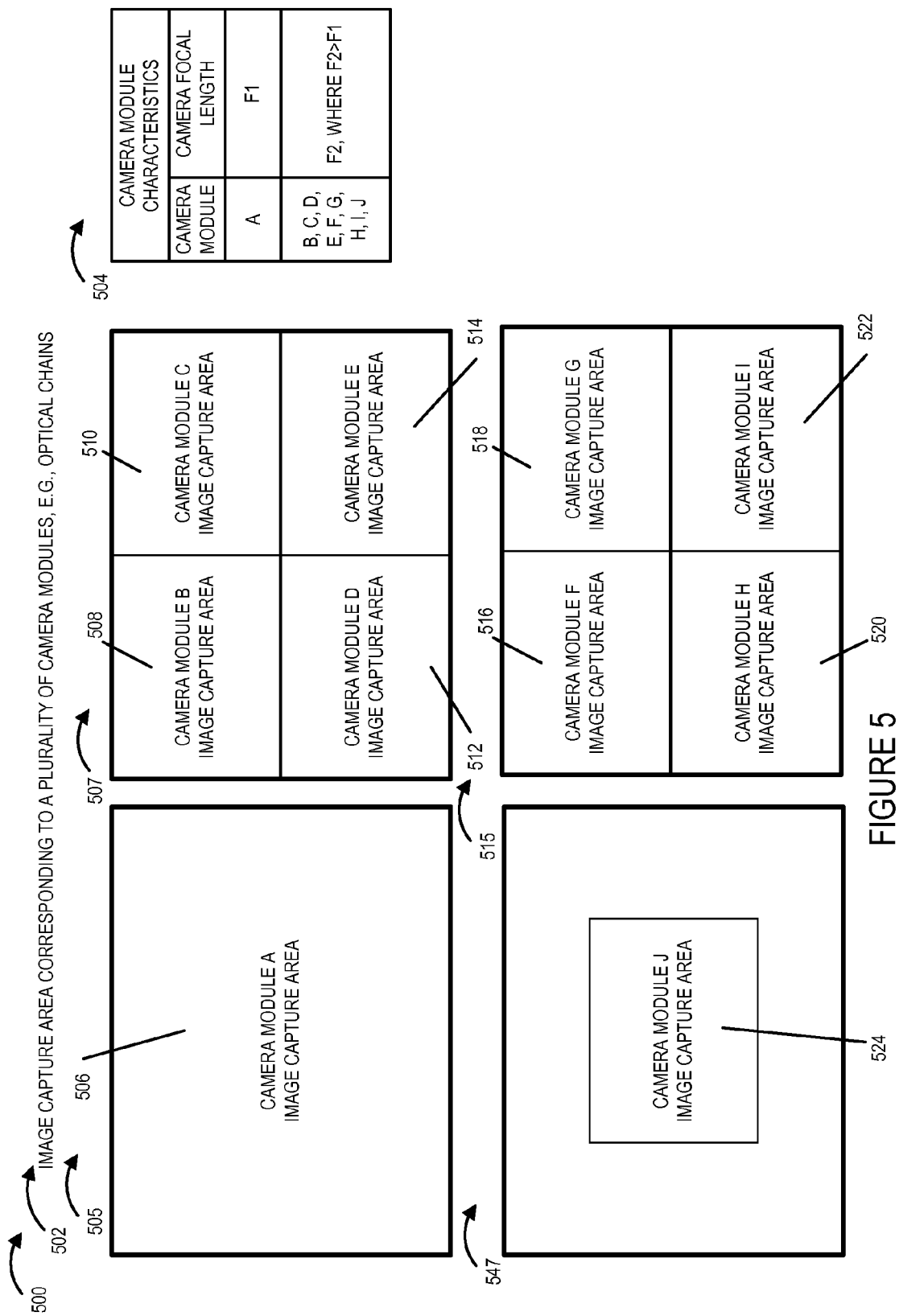
FIG. 5 is a drawing illustrating exemplary image capture image areas corresponding to a plurality of camera modules in accordance with an exemplary embodiment.

FIG. 5 is a drawing 500 including drawings 502 illustrating exemplary image capture areas corresponding to a plurality of camera modules included in an exemplary camera device and a table 504 identifying camera module characteristics. Drawing 502 includes a drawing 505, a drawing 507, a drawing 515, and a drawing 547. Drawing 505, 507, 515 and 547 correspond to the same scene and may be viewed as aligned on top of one another. Table 504 indicates that camera module A has a focal length=F1; camera modules B, C, D, E, F, G, H, I, and J have a focal length=F2, where F2>F1. In this example, the camera modules with focal length F1 has a larger field of view than a camera module with focal length F2. Also, for this example, consider that the field of view of each camera module remains fixed with respect to one another.

Drawing 505 illustrates camera module A image capture area 506. Drawing 507 illustrates camera module B image capture area 508, camera module C image capture area 510, camera module D image capture area 512, and camera module E image capture area 514. Drawing 515 illustrates camera module F image capture area 516, camera module G image capture area 518, camera module H image capture area 520, and camera module I image capture area 522. Drawing 547 illustrates camera module J image capture area 524.

In this example, camera module A is a first type camera module, and camera modules B, C, D, E, F, G, H, I, J are second type camera modules. The first type camera module has a larger field of view than the second type camera modules.

Figure 6:
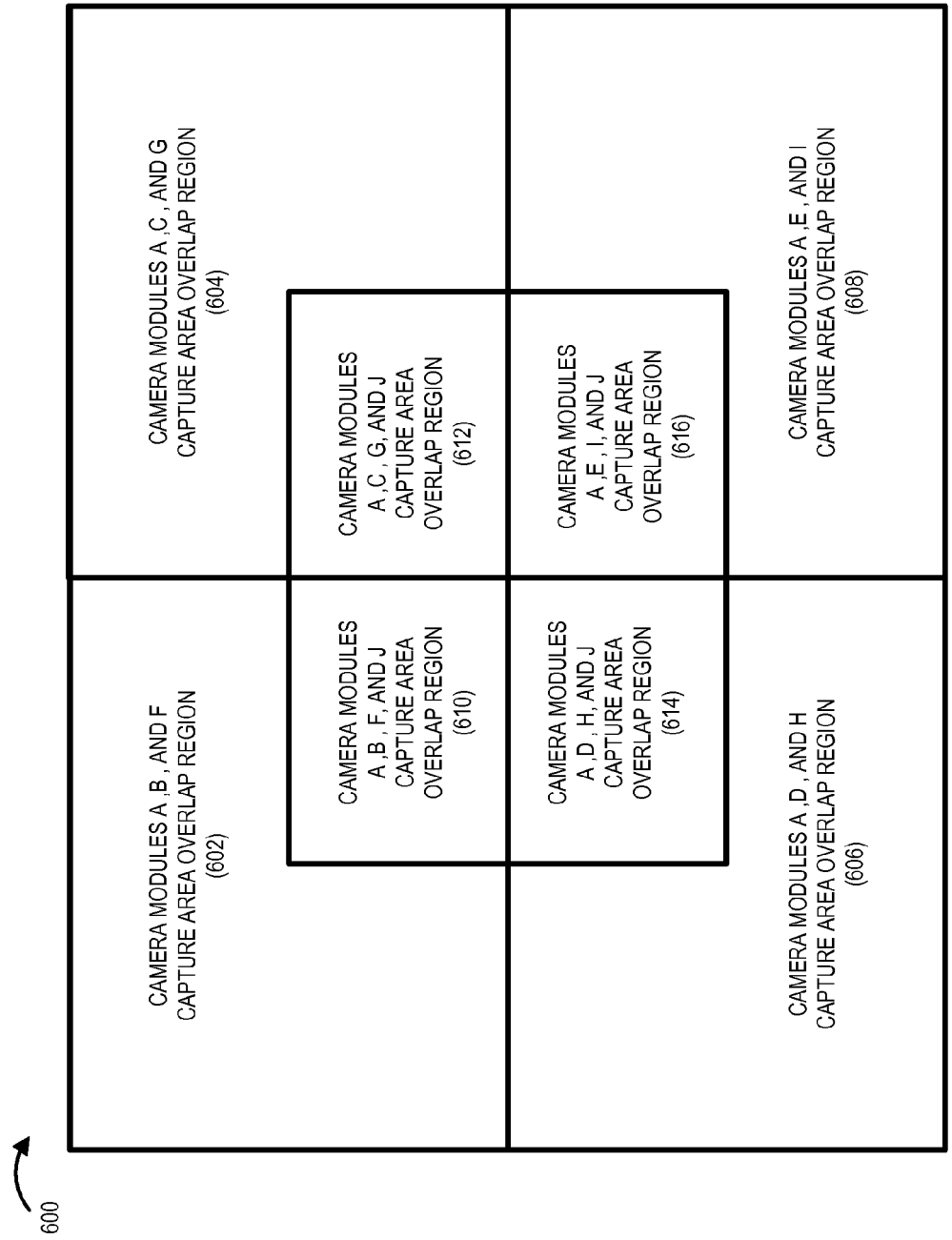
FIG. 6 is a drawing illustrating the overlaying of the camera image capture areas corresponding to camera modules FIG. 5.

FIG. 6 is a drawing 600 illustrating the overlaying of the camera image capture areas corresponding to camera modules FIG. 5. Area 602 is an overlap region corresponding to the capture area of camera modules A, B, and F. Area 604 is an overlap region corresponding to the capture area of camera modules A, C, and G. Area 606 is an overlap region corresponding to the capture area of camera modules A, D, and H. Area 608 is an overlap region corresponding to the capture area of camera modules A, E, and I. Area 610 is an overlap region corresponding to the capture area of camera modules A, B, F, and J. Area 612 is an overlap region corresponding to the capture area of camera modules A, C, G, and J. Area 614 is an overlap region corresponding to the capture area of camera modules A, D, H, and J. Area 616 is an overlap region corresponding to the capture area of camera modules A, E, I, and J.

Figure 7:
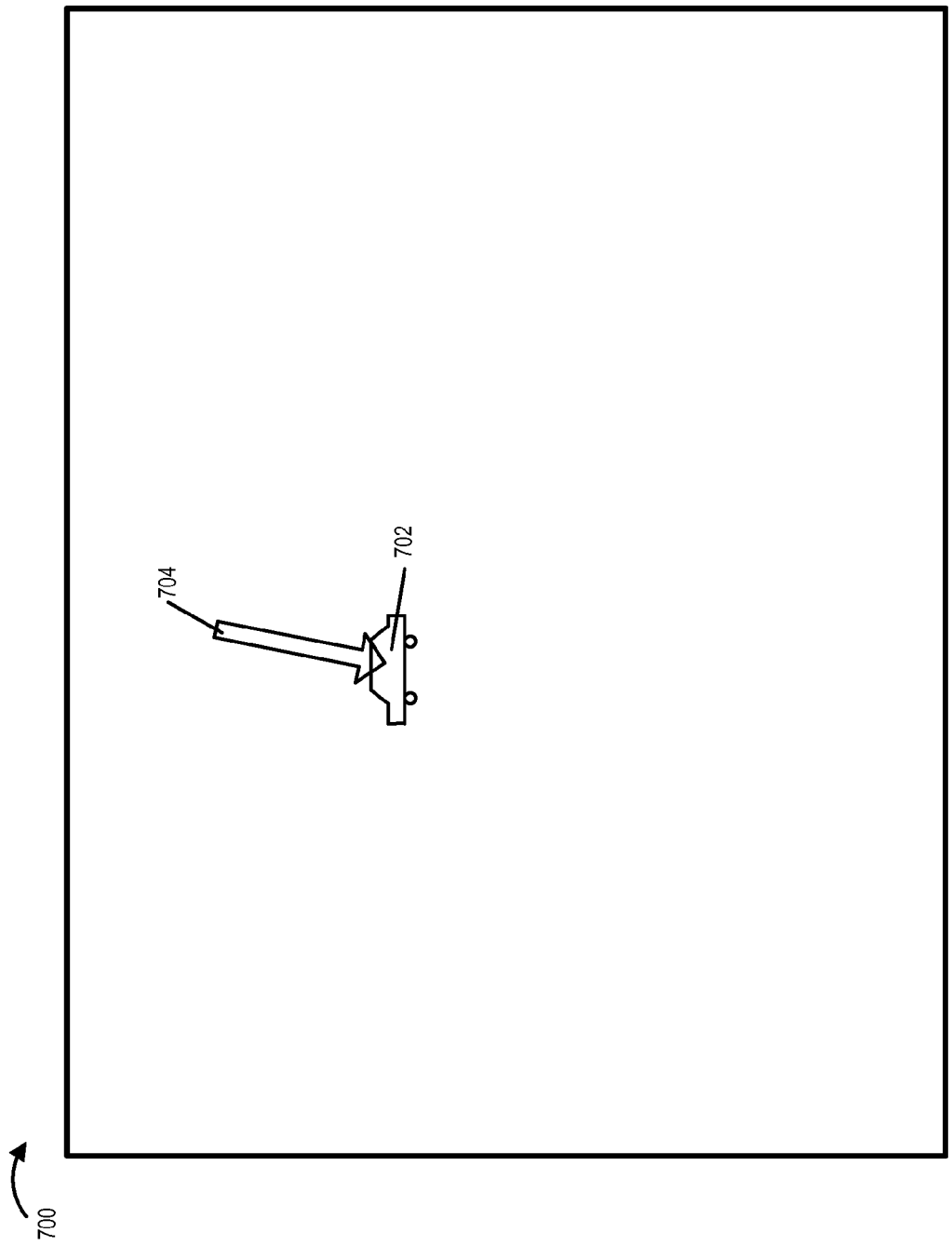
FIG. 7 illustrates an image captured by camera module A, which is a first type camera module, and user selection of an object of interest.

FIG. 7-12 illustrate an example in which a camera including camera modules which capture image areas as shown in FIG. 5 implements the method of flowchart 200 of FIG. 2. Drawing 700 of FIG. 7 illustrates an image captured by camera module A, which is a first type camera module. The captured image is displayed on a touch screen display. The user selects object of interest 702 by touching the screen on the object as indicated by large arrow 704.

Figure 8:
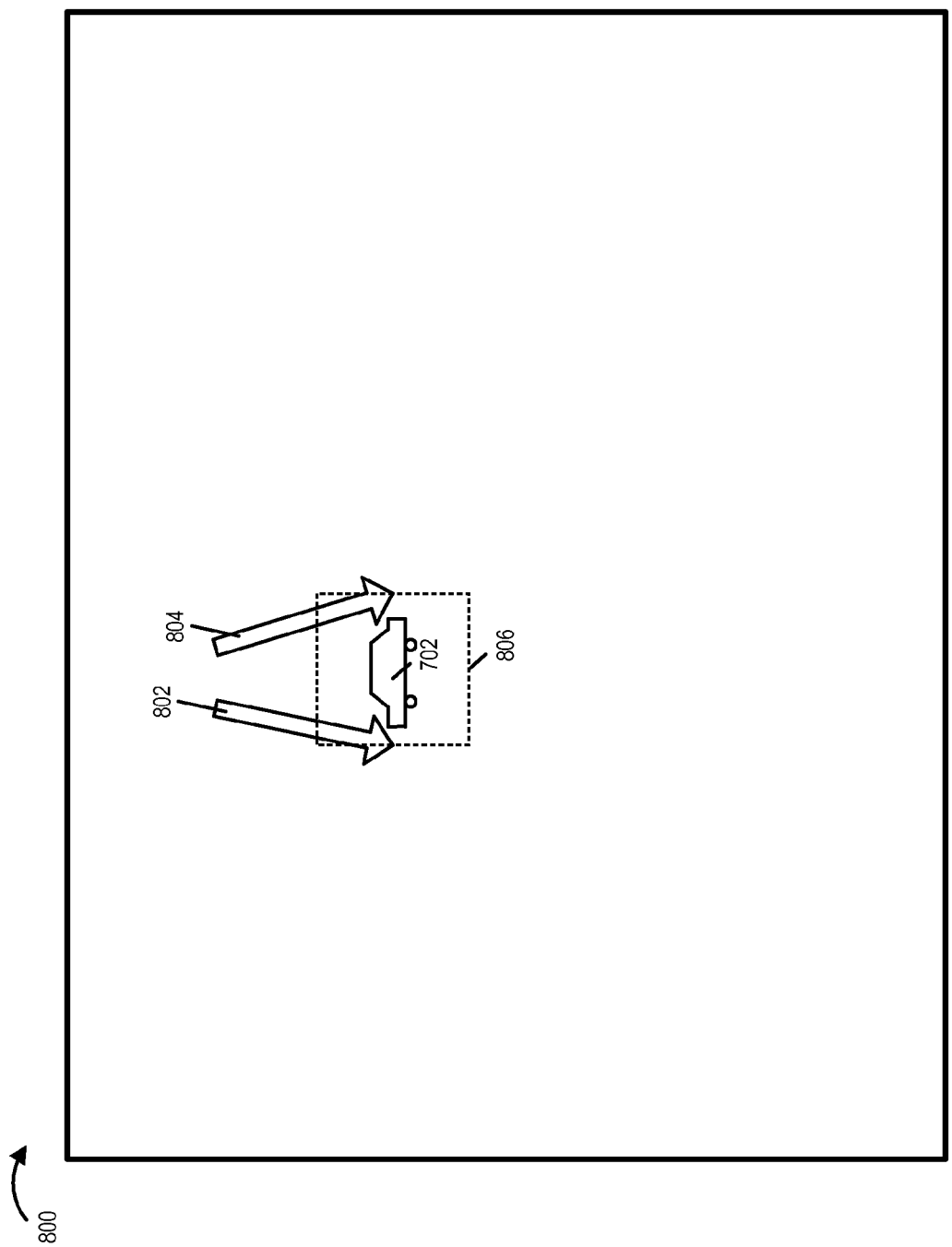
FIG. 8 illustrates user selection of an area surrounding an object of interest to be captured.

In drawing 800 of FIG. 8, the user indicates a size of an area surrounding the object of interest to be captured, e.g., by touching two points on the screen or sliding his fingers to the two points, as indicated by the two larger arrows 802 and 804. The camera device identifies the user selected area surrounding the object of interest as indicated by dotted box 806 surrounding the object of interest 702.

Figure 9:
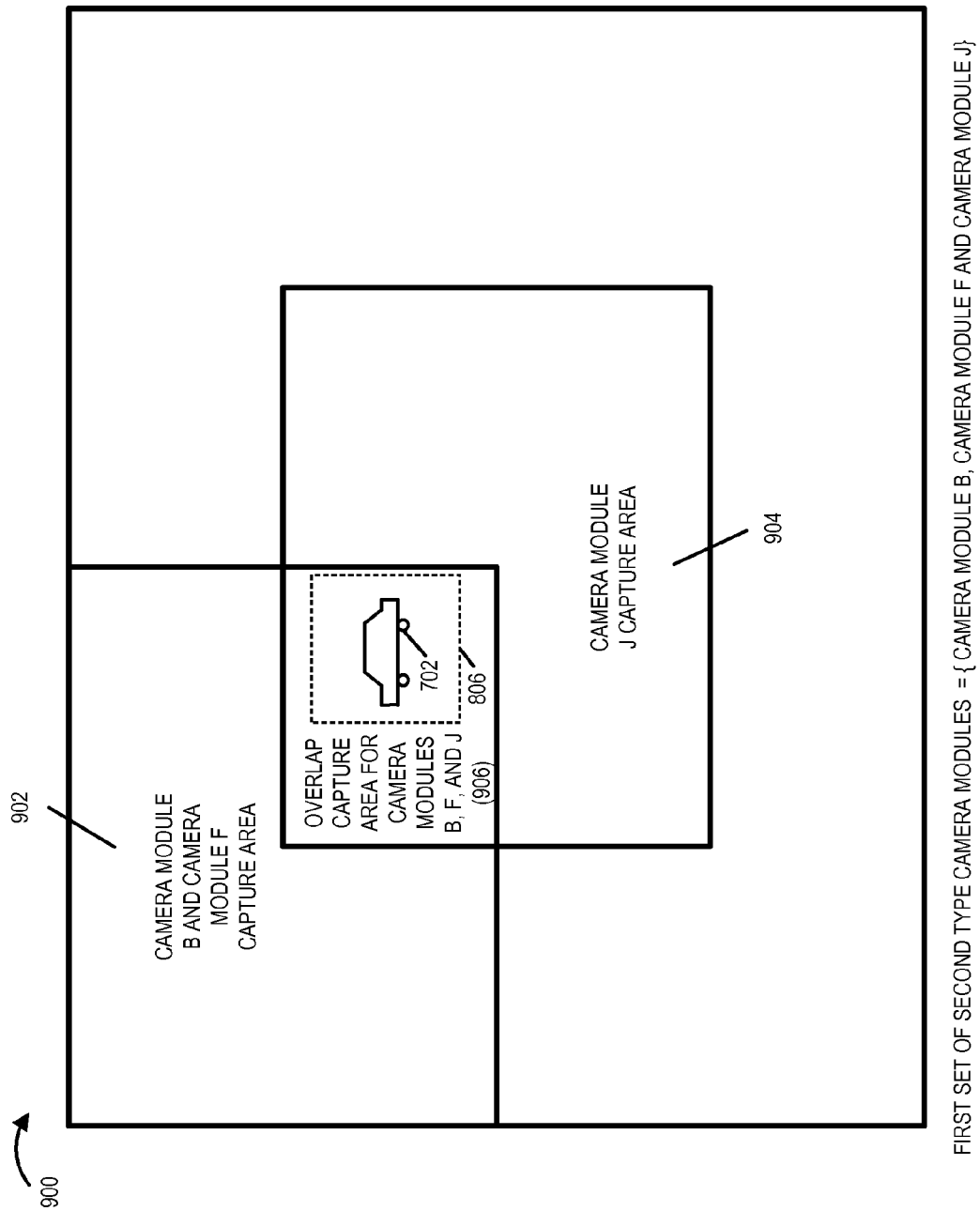
FIG. 9 illustrates a camera device identified set of second type camera modules that should be used to capture images of the object of interest based on the user input.

Drawing 900 of FIG. 9 illustrates the camera device identifies a set of second type camera modules that should be used to capture images of the object of interest based on the user input. In this example, the first set of second type camera module={camera module B, camera module F, and camera module J. The camera device captures images using the first set of second type camera modules while the object of interest remains in the areas corresponding to the first set, e.g., overlapping area 906 of modules B, F and J. The rectangular area 902 is the capture area for camera modules B and camera module F, and the rectangular area 904 is the capture are for camera module J 904.

Figure 10:
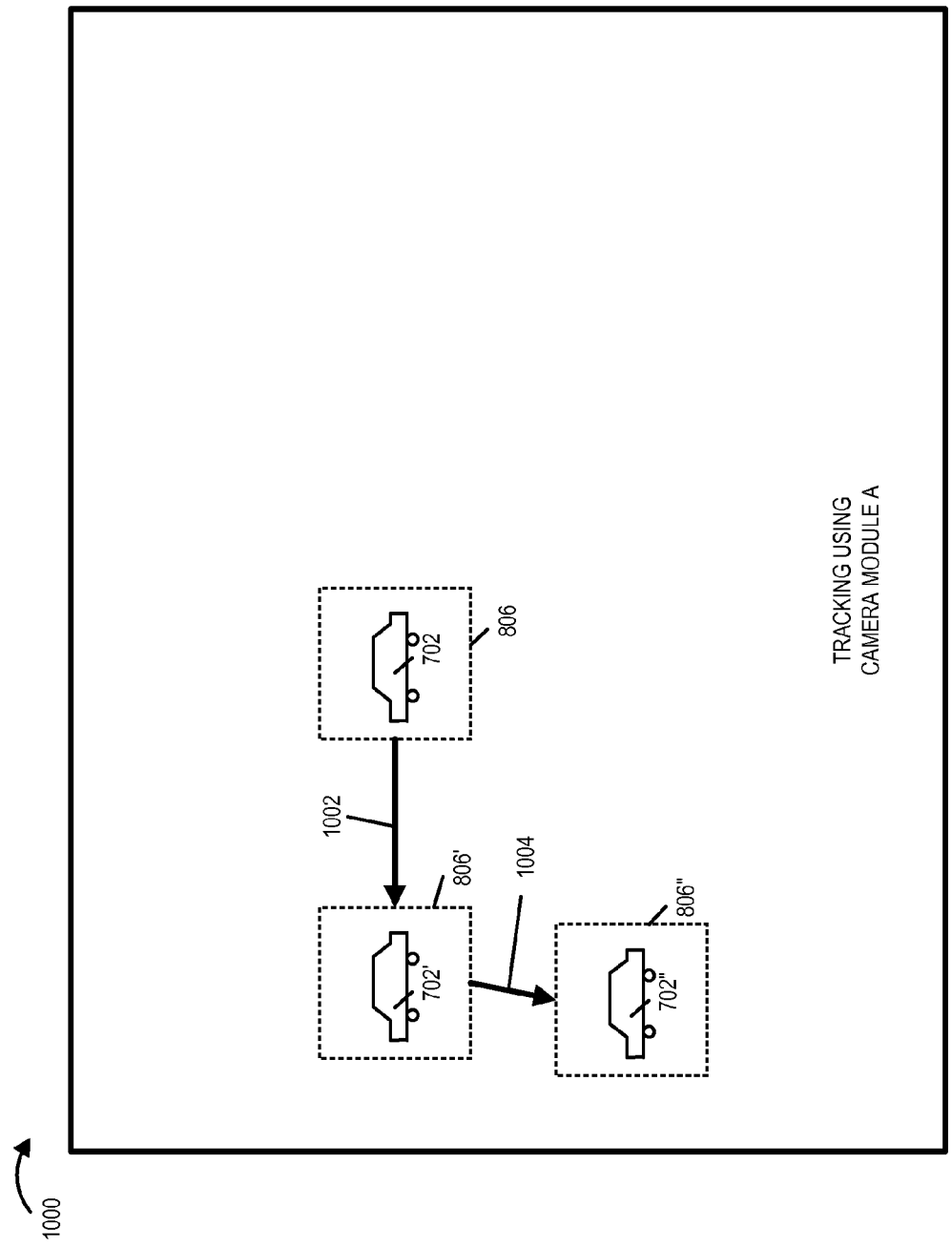
FIG. 10 illustrates that the camera device tracks the object of interest using first type camera module A, as the object of interest moves to new positions.

Drawing 1000 of FIG. 10 illustrates that the camera device tracks the object of interest using first type camera module A, as the object of interest moves to new positions as indicated by arrow 1002 and arrow 1004. The object of interest 702 with corresponding surrounding area to be captured 806 moves in the direction indicated by arrow 1002. The object is interest and the corresponding surrounding area to be captured is shown, as indicated by object 702' and surrounding area 806', at a new location in which a second set of second type camera modules are to be used to capture images, the second set being different from said first set. The object of interest with its corresponding surrounding area to be captured moves in the direction indicated by arrow 1004. The object is interest and the corresponding surrounding area to be captured is shown, as indicated by object 702" and surrounding area 806", at another new location in which a third set of second type camera modules are to be used to capture images, said third set being different from said second set.

Figure 11:
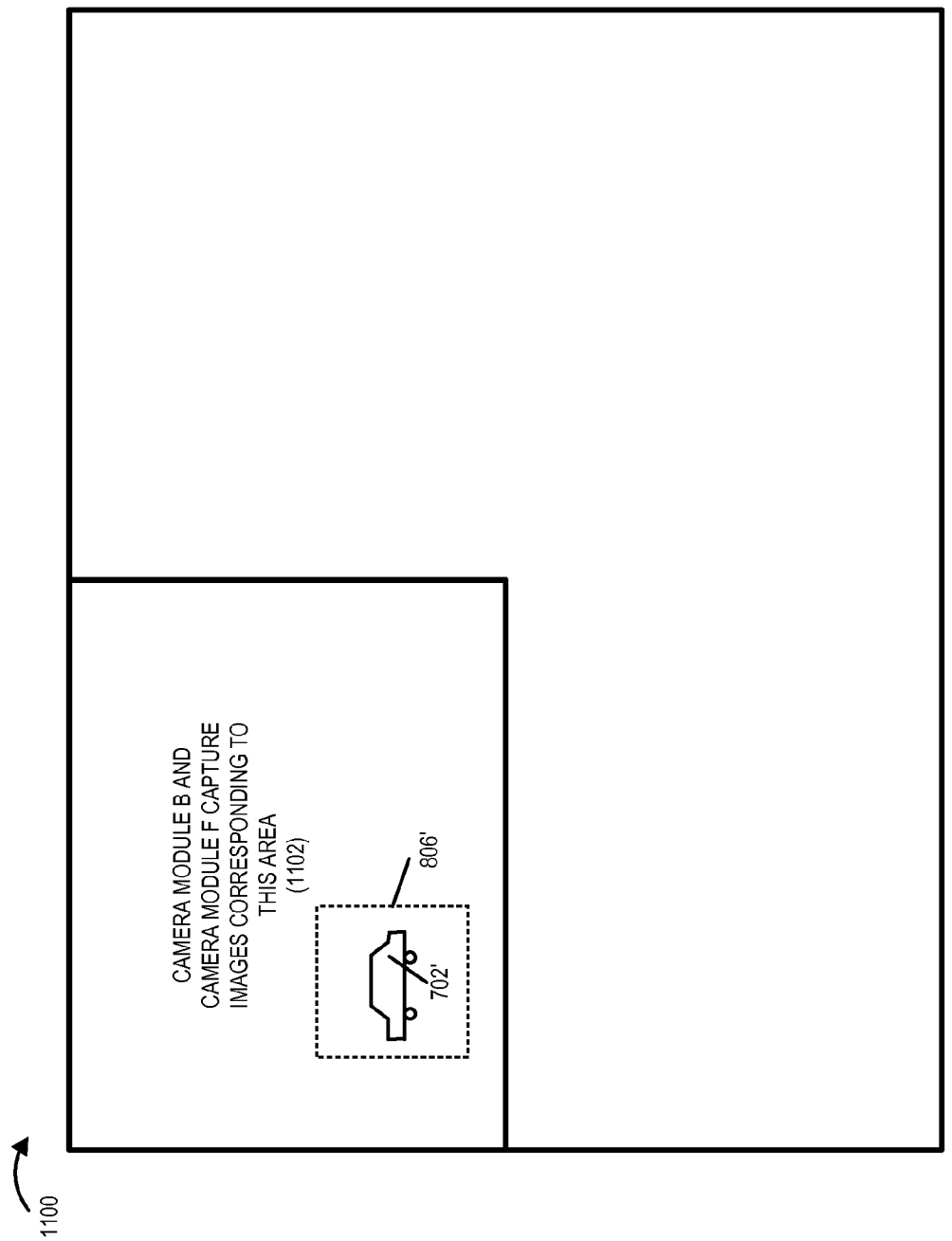
FIG. 11 illustrates that the camera device has identifies a second set of second type camera modules that should be used to capture images of the object of interest based on the user input and based on the new location of the object of interest.

Drawing 1100 of FIG. 11 illustrates that the camera device has identifies a second set of second type camera modules that should be used to capture images of the object of interest based on the user input and based on the new location of the object of interest. The object of interest and its corresponding surrounding area to be captured are indicated by (702', 806'). In this example, the second set of second type camera module={camera module B, camera module F}. The camera device captures images using the second set of second type camera modules while the object of interest remains in the area corresponding to the second set, e.g., overlapping area 1102 corresponding to modules B and F.

Figure 12:
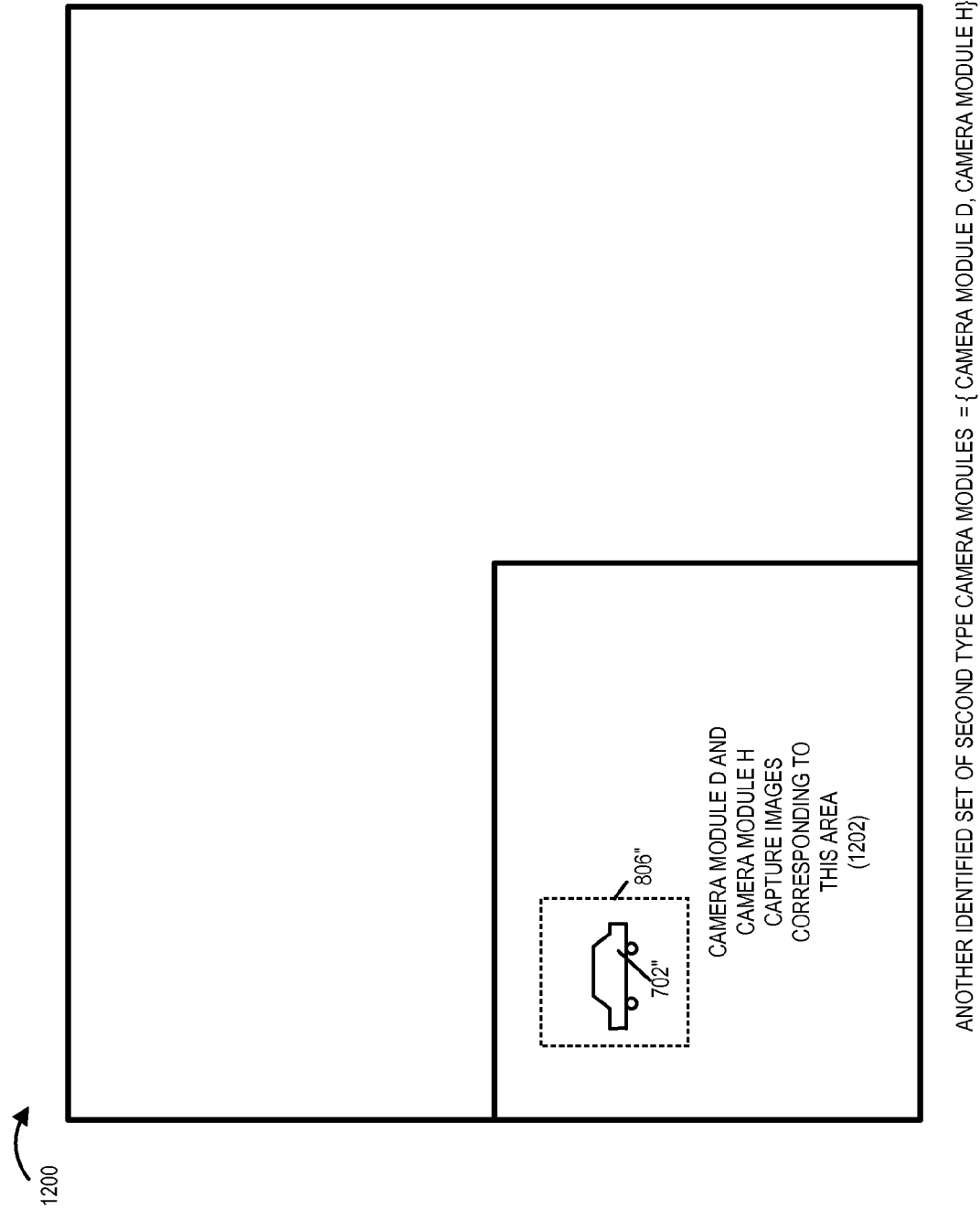
FIG. 12 illustrates that the camera device has identifies another set of second type camera modules that should be used to capture images of the object of interest based on the user input and based on the second new location of the object of interest.

Drawing 1200 of FIG. 12 illustrates that the camera device has identifies a another set of second type camera modules, e.g., a third set of second type camera modules, that should be used to capture images of the object of interest based on the user input and based on the second new location of the object of interest. The object of interest and its corresponding surrounding area to be captured are indicated by (702", 806"). In this example, the another set of second type camera module={camera module D, camera module H}. The camera device captures images using the another set of second type camera modules while the object of interest remains in the area corresponding to the another set, e.g., overlapping area 1202 corresponding to modules D and H.

Figure 13:
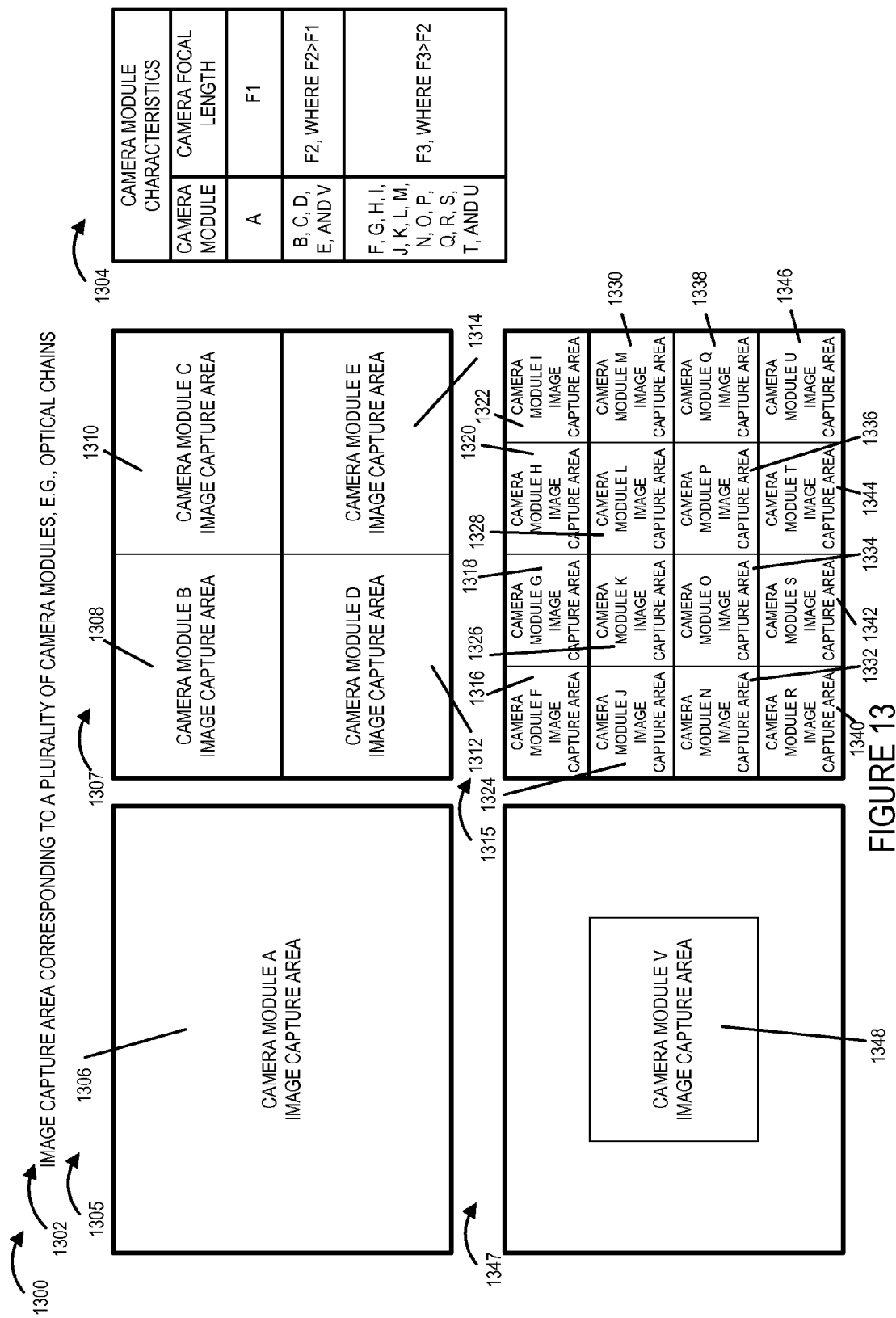
FIG. 13 is a drawing illustrating exemplary image capture image areas corresponding to a plurality of camera modules in accordance with an exemplary embodiment, said plurality of camera modules including three types of camera modules.

FIG. 13 is a drawing 1300 including drawings 1302 illustrating exemplary image capture areas corresponding to a plurality of camera modules included in an exemplary camera device and a table 1304 identifying camera module characteristics. Drawing 1302 includes a drawing 1305, a drawing 1307, a drawing 1315, and a drawing 1347. Drawing 1305, 1307, 1515 and 1347 correspond to the same scene and may be viewed as aligned on top of one another. Table 1304 indicates that camera module A has a focal length=F1; camera modules B, C, D, E and V have a focal length=F2, where F2>F1; and camera modules F, G, H, I, J, K, L, M, N, O, P, Q, R, S, T and U have a focal length=F3, where F3>F2. In this example, camera modules with different focal lengths have size fields of view.

Drawing 1305 illustrates camera module A image capture area 1306. Drawing 1307 illustrates camera module B image capture area 1308, camera module C image capture area 1310, camera module D image capture area 1312, and camera module E image capture area 1314. Drawing 1315 illustrates camera module F image capture area 1316, camera module G image capture area 1318, camera module H image capture area 1320, camera module I image capture area 1322, camera module J image capture area 1324, camera module K image capture area 1326, camera module L image capture area 1328, camera module M image capture area 1330 camera module N image capture area 1332, camera module O image capture area 1334, camera module P image capture area 1336, camera module Q image capture area 1338 camera module R image capture area 1340, camera module S image capture area 1342, camera module T image capture area 1344, and camera module U image capture area 1346. Drawing 1347 illustrates camera module V image capture area 1348.

In this example, camera module A is a first type camera module, and camera modules B, C, D, E, F, and V are second type camera modules and modules G, H, I, J, K, L, M, N, O, P, Q, R, S, T, and U are third type camera modules. The first type camera module has a larger field of view than any of the second type camera modules or the third type camera modules.

In various embodiments, object tracking is performed using images captured by first type camera module A. In some such embodiments, sets of second and third type modules are identified, selected and used to capture images of the object of interest based on the location of the object of interest.

Figure 14:
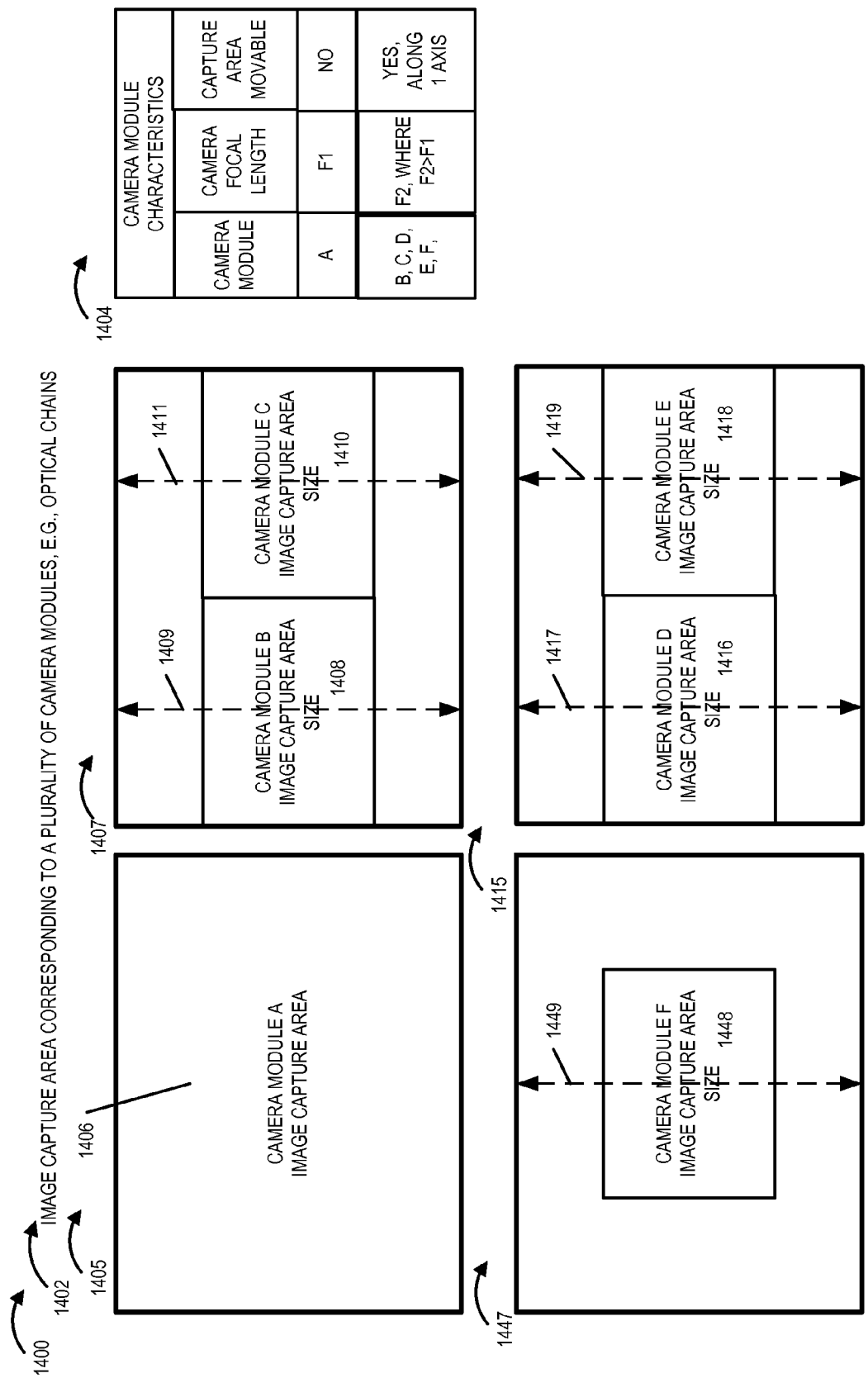
FIG. 14 is a drawing illustrating exemplary image capture areas corresponding to a plurality of camera modules included in an exemplary camera device in which the image area corresponding to at least some camera modules can be adjusted in one direction, in accordance with an exemplary embodiment.

FIG. 14 is a drawing 1400 including drawings 1402 illustrating exemplary image capture areas corresponding to a plurality of camera modules included in an exemplary camera device and a table 1404 identifying camera module characteristics. Drawing 1402 includes a drawing 1405, a drawing 1407, a drawing 1415, and a drawing 1447. Drawing 1405, 1407, 1415 and 1447 correspond to the same scene and may be viewed as aligned on top of one another. Table 1404 indicates that camera module A has a focal length=F1 and the capture area is not moveable; camera modules B, C, D, E, and F have a focal length=F2, where F2>F1, and the capture area is moveable along one axis. In this example, the camera modules with focal length F1 has a larger field of view than a camera module with focal length F2. Thus, second type camera modules can be, and sometimes are, controlled to move, e.g., adjust, their capture area position in response to a position of an object of interest.

Drawing 1405 illustrates camera module A image capture area 1406. Drawing 1407 illustrates camera module B has an image capture area size 1408 and can be moved along axis 1409, and camera module C has image capture area size 1410 and can be moved along axis 1411. Drawing 1415 illustrates camera module D has image capture area size 1416 and can be moved along axis 1417, and camera module E image capture area size 1418 and can be moved along axis 1419. Drawing 1447 illustrates camera module F has image capture area 1448 and can be moved along axis 1449.

In this example, camera module A is a first type camera module, and camera modules B, C, D, E, and F are second type camera modules. The first type camera module has a larger field of view than the second type camera modules.

In this example some exemplary alternative sets of second type camera modules include: S1={camera module B, camera module D}; S2={camera module B, camera module D, camera module F}; S3={camera module F, camera module C, camera module E}; and S4={camera module C, camera module E}. Different sets may be identified and used at different times to capture images of an identified object of interest based on the location, e.g., as determined by tracking using images captured by first type camera module A.

Figure 15:
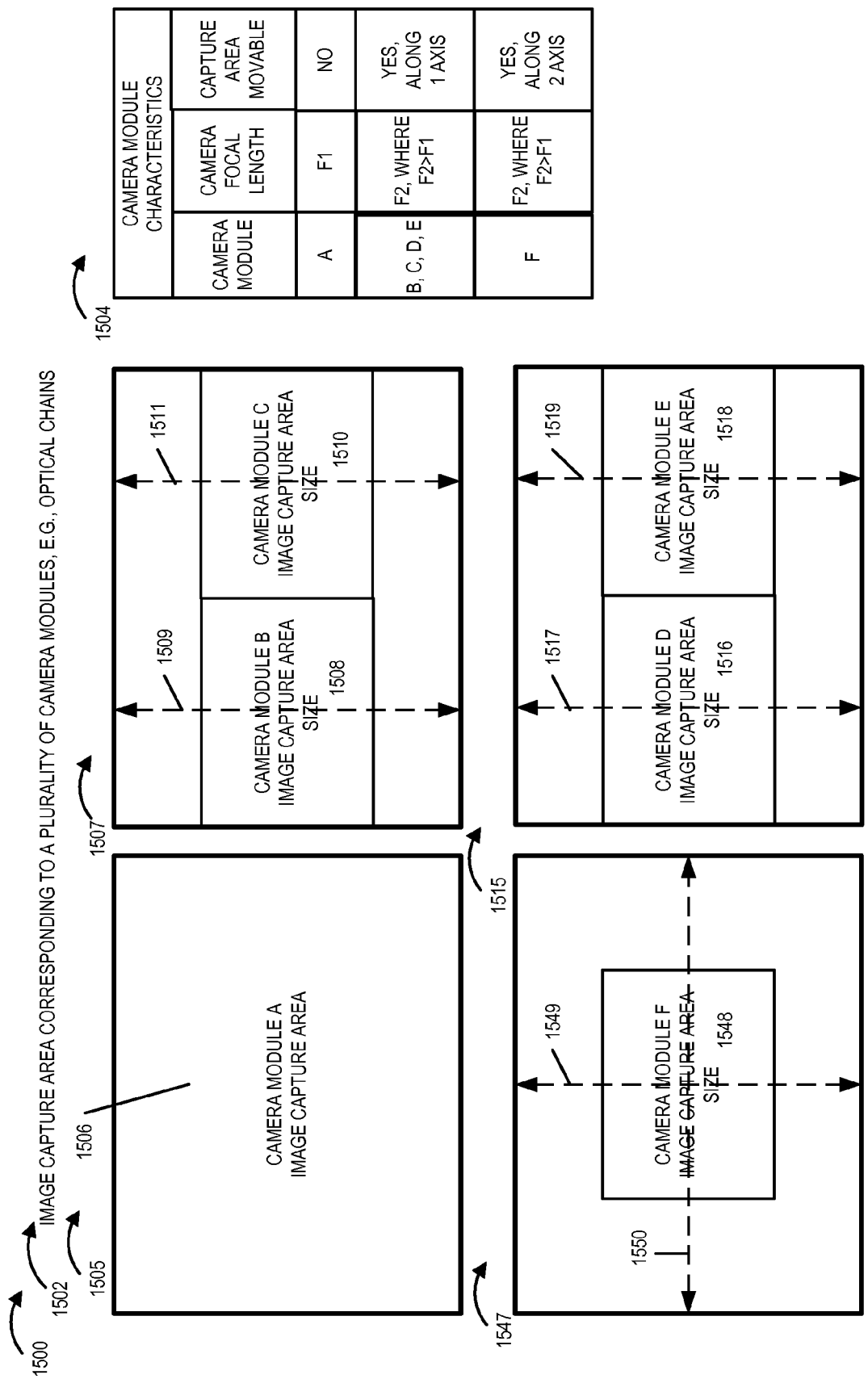
FIG. 15 is a drawing illustrating exemplary image capture areas corresponding to a plurality of camera modules included in an exemplary camera device in which the image area corresponding to a plurality of camera modules can be adjusted in one direction and the image area corresponding to one camera module can be adjusted in two directions, in accordance with an exemplary embodiment.

FIG. 15 is a drawing 1500 including drawings 1502 illustrating exemplary image capture areas corresponding to a plurality of camera modules included in an exemplary camera device and a table 1504 identifying camera module characteristics. Drawing 1502 includes a drawing 1505, a drawing 1507, a drawing 1515, and a drawing 1547. Drawing 1505, 1507, 1515 and 1547 correspond to the same scene and may be viewed as aligned on top of one another. Table 1504 indicates that camera module A has a focal length=F1 and the capture area is not moveable; camera modules B, C, D, and E have a focal length=F2, where F2>F1, and the capture area is moveable along one axis; camera module F has a focal length=F2, where F2>F1, and the capture area is moveable along two axes. In this example, the camera modules with focal length F1 has a larger field of view than a camera module with focal length F2. Thus, second type camera modules can be, and sometimes are, controlled to move, e.g., adjust, their capture area position in response to a position of an object of interest.

Drawing 1505 illustrates camera module A image capture area 1506. Drawing 1507 illustrates camera module B has an image capture area size 1508 and can be moved along axis 1509, and camera module C has image capture area size 1510 and can be moved along axis 1511. Drawing 1515 illustrates camera module D has image capture area size 1516 and can be moved along axis 1517, and camera module E image capture area size 1518 and can be moved along axis 1519. Drawing 1547 illustrates camera module F has image capture area 1548 and can be moved along axis 1449 and axis 1550. Thus the capture area for camera module F can be moved along both an X and Y axis.

In this example, camera module A is a first type camera module, and camera modules B, C, D, E, and F are second type camera modules. The first type camera module has a larger field of view than the second type camera modules.

In this example some exemplary alternative sets of second type camera modules include: S1={camera module B, camera module D, camera module F}; S2={camera module F, camera module C, camera module E}. Different sets may be identified and used at different times to capture images of an identified object of interest based on the location, e.g., as determined by tracking using images captured by first type camera module A.

In some embodiments, adjustments to camera module B, C, D, and E include changing an angle of inclination of a mirror of the camera module. In some embodiments, adjustments to camera module F include changing an angle of inclination of a mirror of the camera module and/or changing a rotation of said mirror.

Figure 16:
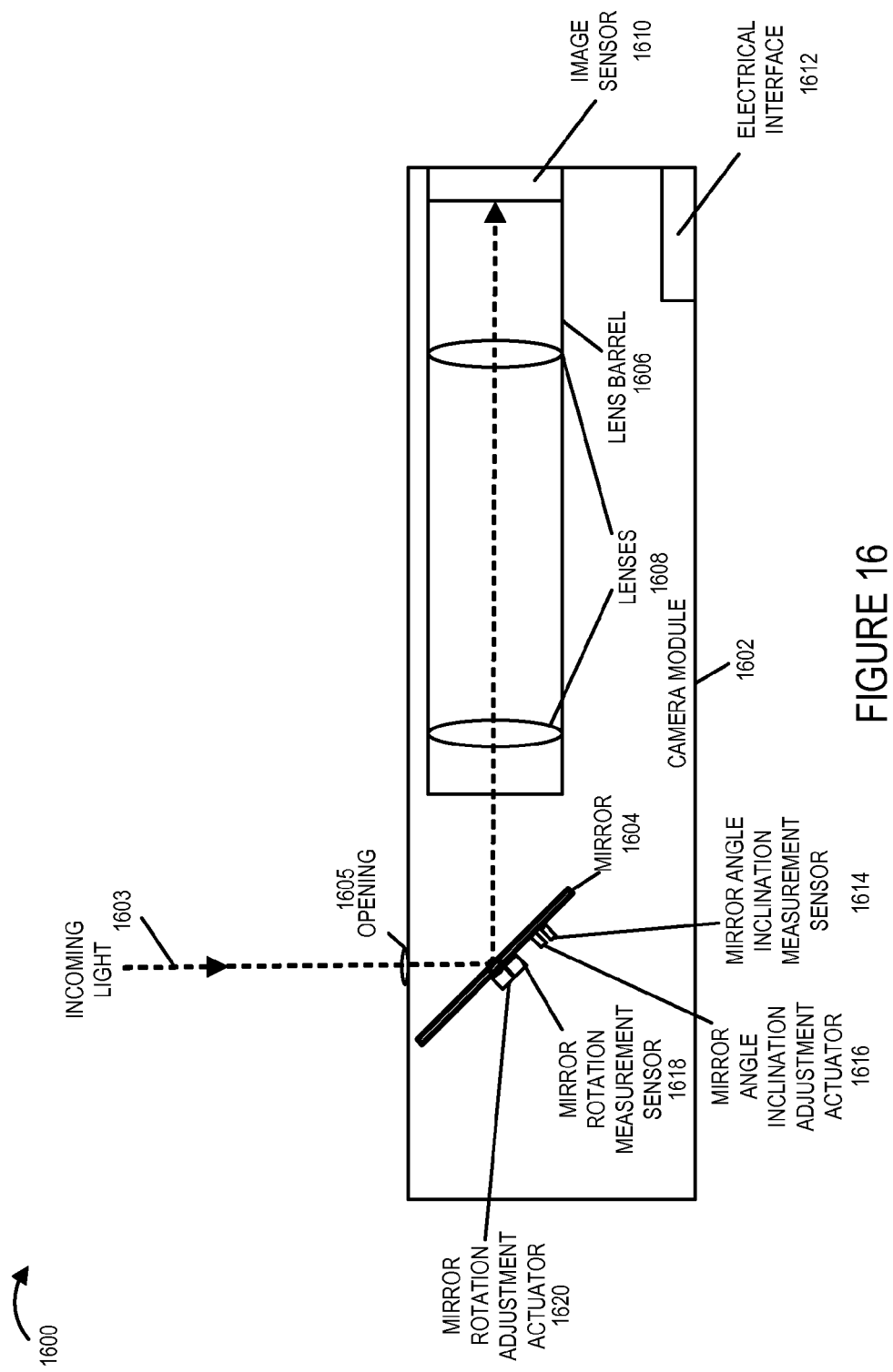
FIG. 16 is a drawing of an exemplary camera module in accordance with some embodiments.

FIG. 16 is a drawing 1600 of an exemplary camera module 1602, e.g., optical chain, in accordance with some embodiments. The camera module 1600 is, e.g. one of the camera modules of plurality of camera modules 302 of camera device 300 of FIG. 3. Exemplary camera module 1602 includes an opening 1605, a mirror 1604, a lens barrel 1606, an image sensor 1610, and an electrical interface 1612. In some embodiments, the mirror's angle of inclination is controllable, and can be changed; and camera module includes a mirror angle inclination sensor 1614 for measuring information used to determination current mirror angle inclination, and a mirror angle inclination adjustment actuator 1616 for moving the mirror angle of inclination. In some embodiments, the mirror can also be controllably rotated; and camera module 1602 includes a mirror rotation measurement sensor 1618, and a mirror rotation adjustment actuator 1620 for rotating the mirror.

In some embodiments, for some camera modules in a camera device the mirror is fixed and is not movable. For example, in some first type camera modules with the largest field of view the mirror is fixed.

In some embodiments, for some second type camera module and/or third type camera modules the camera module includes the capability to change the mirror angle of inclination, e.g., camera modules B, C, D, E, and F corresponding to the example of FIG. 14 or camera modules B, C, D, and E corresponding to the example of FIG. 15.

In some embodiments, for some second type camera module and/or third type camera modules the camera module includes the capability to change the mirror angle of inclination and in addition the mirror can be rotated along another axis, e.g., camera module F corresponding to the example of FIG. 15.

Incoming light 1603 enters the camera module 1602 through opening 1605, is redirected by mirror 1604 and traverses lenses 1608 of lens barrel 1606 and is detected by image sensor 1610. Electrical interface 1612 includes connections to the image sensor 1610, measurements sensors (1614, 1618), and actuators (1616, 1620) coupling the camera module 1602 to other elements in the camera device, e.g., a processor, via a bus.

Figure 17:
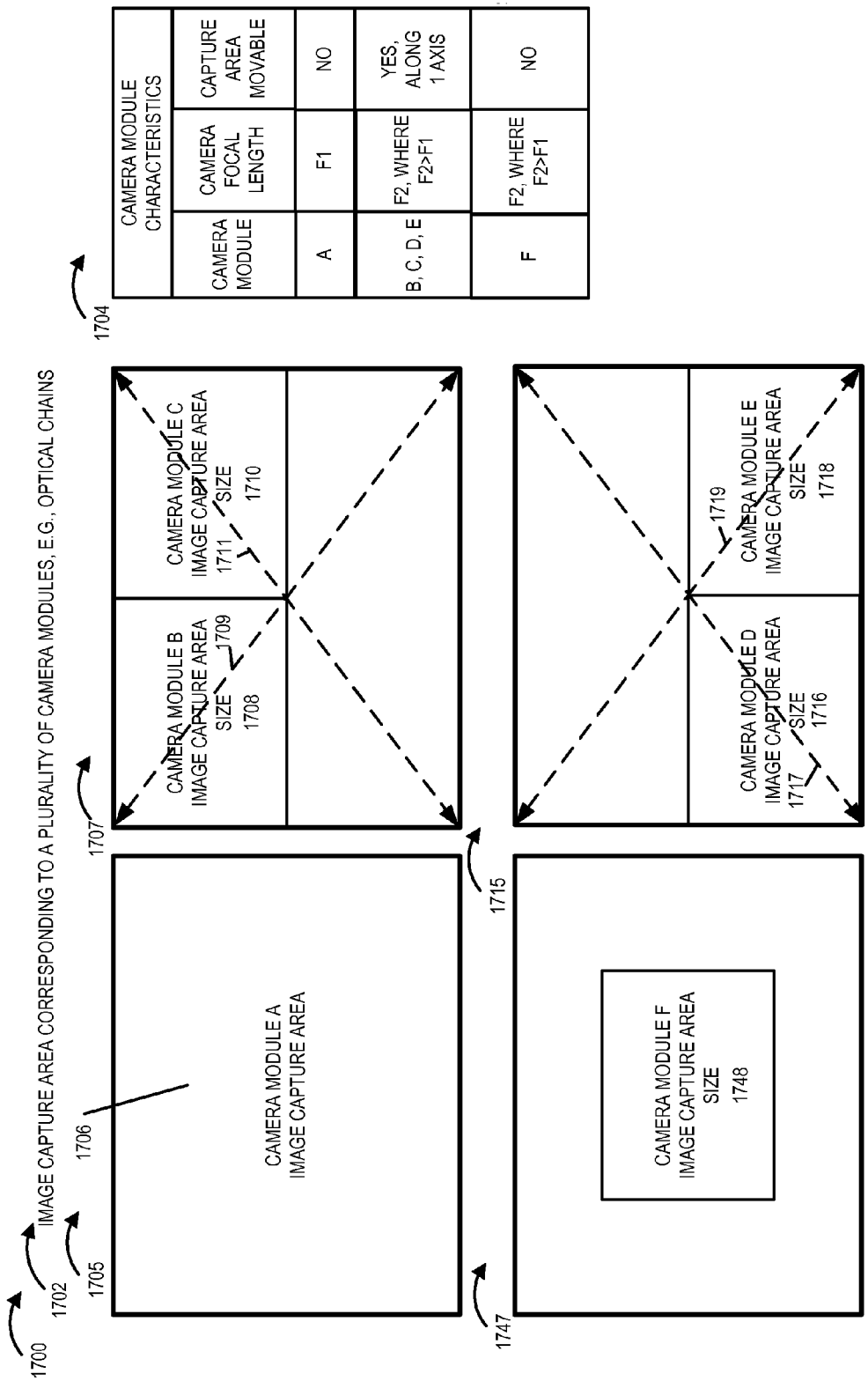
FIG. 17 is a drawing illustrating exemplary image capture areas corresponding to a plurality of camera modules included in an exemplary camera device in which the image area corresponding to at least some camera modules can be adjusted in one direction, in accordance with an exemplary embodiment.

FIG. 17 is a drawing 1700 including drawings 1702 illustrating exemplary image capture areas corresponding to a plurality of camera modules included in an exemplary camera device and a table 1704 identifying camera module characteristics. Drawing 1702 includes a drawing 1705, a drawing 1707, a drawing 1715, and a drawing 1747. Drawing 1705, 1707, 1715 and 1747 correspond to the same scene and may be viewed as aligned on top of one another. Table 1704 indicates that camera module A has a focal length=F1 and the capture area is not moveable; camera modules B, C, D, and E, have a focal length=F2, where F2>F1, and the capture area is moveable along one axis; and camera module F, have a focal length=F2, where F2>F1, and the capture area is not moveable. In this example, the camera modules with focal length F1 has a larger field of view than a camera module with focal length F2. Thus, second type camera modules (B, C, D, and E) can be, and sometimes are, controlled to move, e.g., adjust, their capture area position in response to a position of an object of interest.

Drawing 1705 illustrates camera module A image capture area 1706. Drawing 1707 illustrates camera module B has an image capture area size 1708 and can be moved along dashed diagonal line 1709, and camera module C has image capture area size 1710 and can be moved along dashed diagonal line 1711. Drawing 1715 illustrates camera module D has image capture area size 1716 and can be moved along dashed diagonal line 1717, and camera module E image capture area size 1718 and can be moved along dashed diagonal axis 1719. Drawing 1747 illustrates camera module F has image capture area 1748 and is fixed.

In this example, camera module A is a first type camera module, and camera modules B, C, D, E, and F are second type camera modules. The first type camera module has a larger field of view than the second type camera modules.

In this example some exemplary alternative sets of second type camera modules include: S1={camera module B, camera module E}; S2={camera module B, camera module E, camera module F}; S3={camera module C, camera module D, camera module F}; and S4={camera module C, camera module D}. Various other alternative sets are possible. Different sets may be identified and used at different times to capture images of an identified object of interest based on the location, e.g., as determined by tracking using images captured by first type camera module A.

Figure 18:
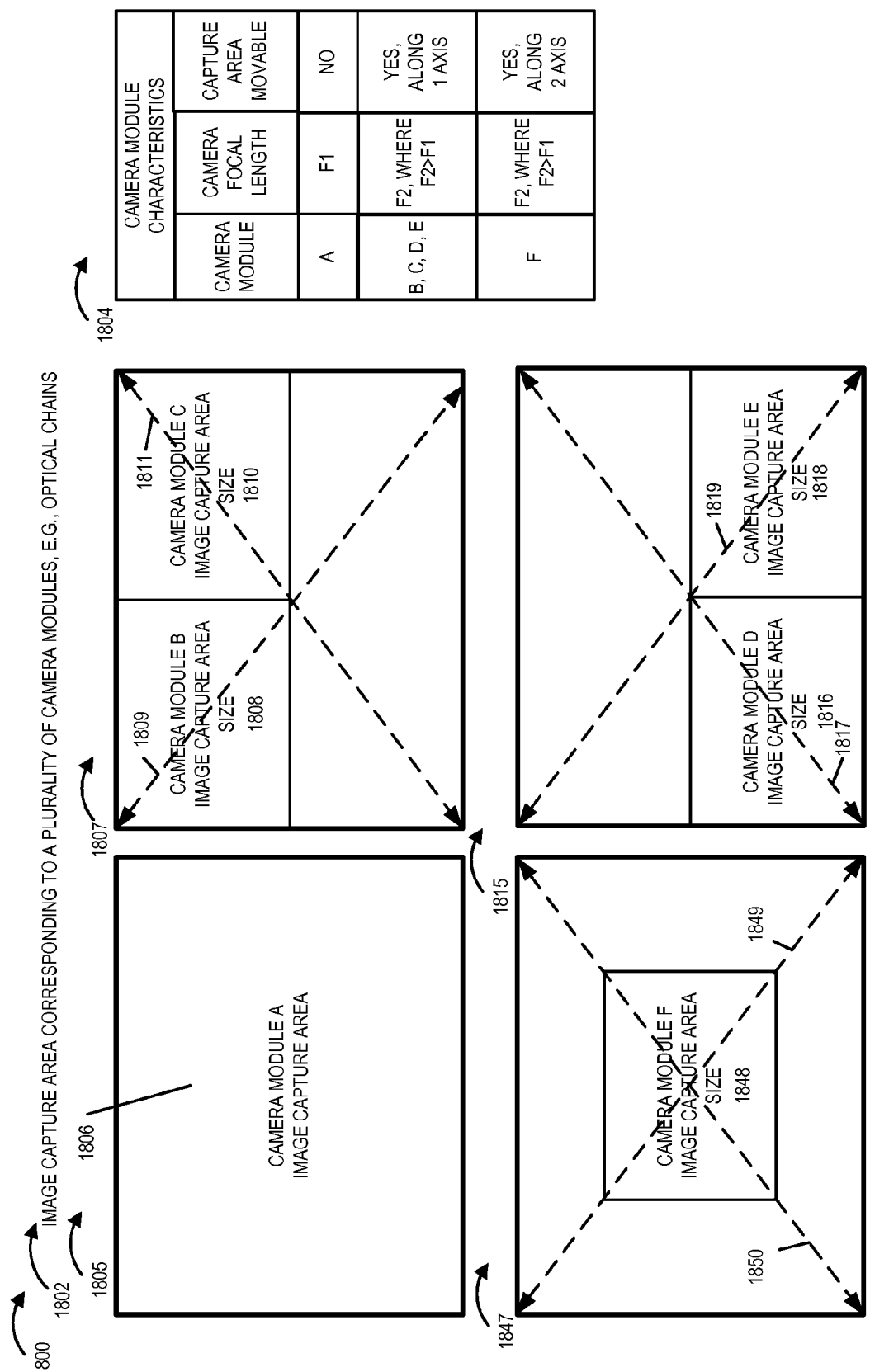
FIG. 18 is a drawing illustrating exemplary image capture areas corresponding to a plurality of camera modules included in an exemplary camera device in which the image area corresponding to a plurality of camera modules can be adjusted in one direction and the image area corresponding to one camera module can be adjusted in two directions, in accordance with an exemplary embodiment.

FIG. 18 is a drawing 1800 including drawings 1802 illustrating exemplary image capture areas corresponding to a plurality of camera modules included in an exemplary camera device and a table 1804 identifying camera module characteristics. Drawing 1802 includes a drawing 1805, a drawing 1807, a drawing 1815, and a drawing 1847. Drawing 1805, 1807, 1815 and 1847 correspond to the same scene and may be viewed as aligned on top of one another. Table 1804 indicates that camera module A has a focal length=F1 and the capture area is not moveable; camera modules B, C, D, and E have a focal length=F2, where F2>F1, and the capture area is moveable along one axis; camera module F has a focal length=F2, where F2>F1, and the capture area is moveable along two axes. In this example, the camera modules with focal length F1 has a larger field of view than a camera module with focal length F2. Thus, second type camera modules can be, and sometimes are, controlled to move, e.g., adjust, their capture area position in response to a position of an object of interest.

Drawing 1805 illustrates camera module A image capture area 1806. Drawing 1807 illustrates camera module B has an image capture area size 1808 and can be moved along dashed diagonal line 1809, and camera module C has image capture area size 1810 and can be moved along dashed diagonal line 1811. Drawing 1815 illustrates camera module D has image capture area size 1816 and can be moved dashed diagonal line 1817, and camera module E image capture area size 1818 and can be moved along axis 1819. Drawing 1847 illustrates camera module F has image capture area 1848 and can be moved along dashed diagonal lines 1849 and 1850.

In this example, camera module A is a first type camera module, and camera modules B, C, D, E, and F are second type camera modules. The first type camera module has a larger field of view than the second type camera modules.

In this example some exemplary alternative sets of second type camera modules include: S1={camera module B, camera module E, camera module F}; and S2={camera module C, camera module D, camera module F}. Many other alternative sets are possible, e.g., including partial overlap between two of more camera module capture areas. Different sets may be identified and used at different times to capture images of an identified object of interest based on the location, e.g., as determined by tracking using images captured by first type camera module A. In various embodiments, power information, e.g., remaining battery power information, power expended to operate various camera modules, etc., is taken into consideration when deciding which camera modules to use to capture an identified object of interest and its surrounding area. In some embodiments, expected camera module image quality is taken into consideration when deciding which camera modules to use at a particular location, e.g., a particular camera module may have an imperfection, e.g., due to dirt, degraded sensor, imperfect lens, etc., at a specific location, which and may be omitted from a selected group of second type camera modules because the object of interest and the corresponding capture area of interest would include effects from the imperfection in the captured image by the camera module.

In some embodiments, adjustments to camera module B, C, D, and E include changing an angle of inclination of a mirror of the camera module. In some embodiments, adjustments to camera module F include changing an angle of inclination of a mirror of the camera module and/or changing a rotation of said mirror.

Figure 19:
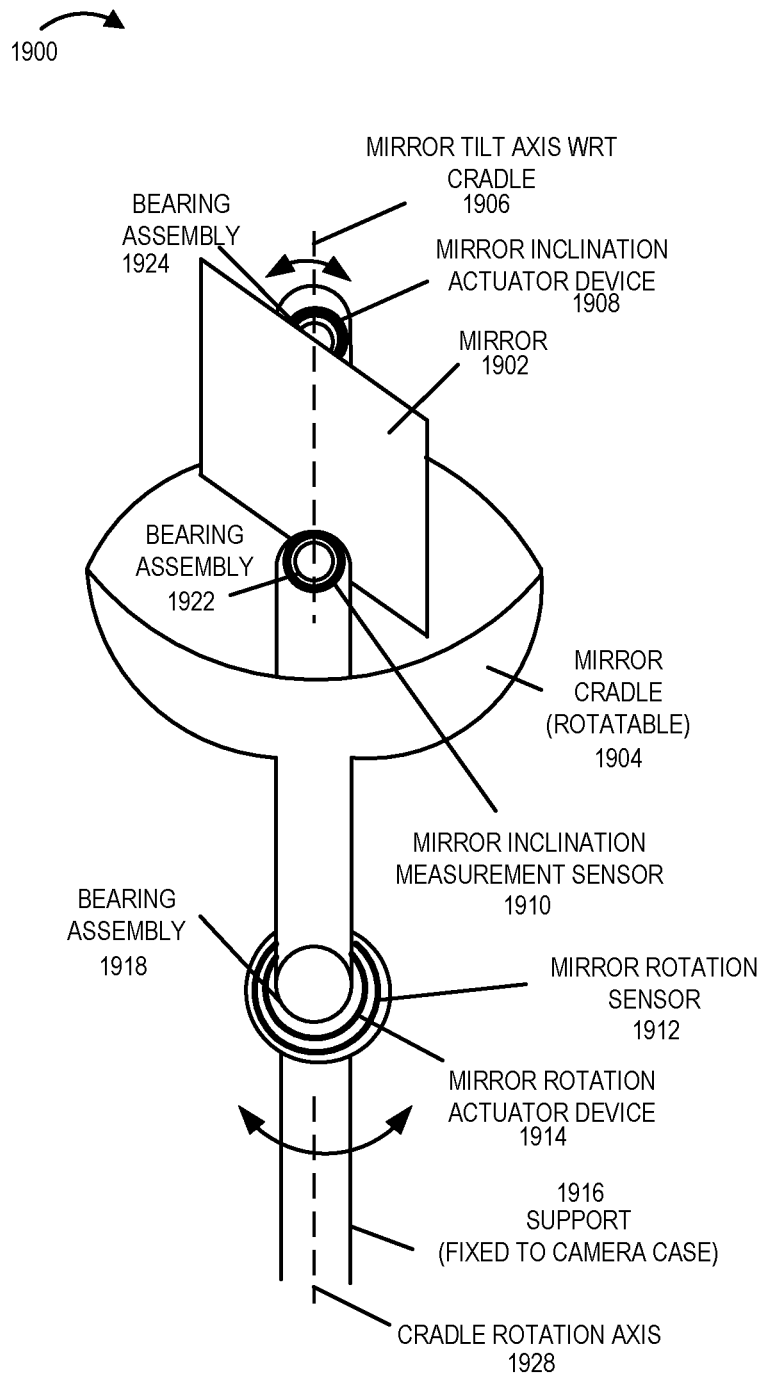
FIG. 19 illustrates an exemplary mirror assembly including a mirror which can be controlled to change an angle of inclination and a rotation of said mirror to point the mirror in different directions in accordance with an exemplary embodiment.

FIG. 19 illustrates an exemplary mirror assembly 1900 including a mirror 1902 which can be controlled to change an angle of inclination and a rotation of said mirror to point the mirror in different directions in accordance with an exemplary embodiment. In some embodiments, mirror assembly 1900 is part of one of the camera modules (322, 324, 236, 238) of camera device 300 and/or camera module F corresponding to FIG. 15 or FIG. 18. In various embodiments the control of mirror 1902 includes closed loop control including a processor, e.g., processor 308 of camera device 300. Mirror assembly 1902 includes mirror 1902, a rotatable mirror cradle 1904, a support 1916, bearing assemblies (1918, 1922, 1924), a mirror inclination actuator device 1908, a mirror inclination measurement sensor 1910, a mirror rotation sensor 1912, and a mirror rotation actuator device 1914.

The mirror 1902 is attached to the ears of the cradle 1904 via bearing assemblies (1922, 1924). Mirror inclination measurement sensor 1910 measures the tilt angle of the mirror 1902 with respect to the cradle 1904 about axis 1906. Mirror inclination actuator device 1910, e.g., a motor and/or motor drive circuitry, is used to drive the mirror 1902 to change, e.g., adjust, and/or maintain a mirror tilt angle with respect to the cradle 1904.

Mirror cradle 1904 is coupled to the support 1916 via bearing assembly 1918. Support 1916 is fixed to the camera device's case. Mirror rotation measurement sensor 1912 measures a rotation angle of the mirror cradle 1904, holding the mirror 1902, with respect to the fixed support 1916 about cradle rotation axis 1928. Mirror rotation actuator device 1914, e.g., a motor and/or motor drive circuitry, is used to drive the mirror cradle holding the mirror 1902 to change, e.g., adjust, and/or maintain a rotation angle with respect to the cradle to adjust and/or maintain a desired position of the mirror. By controlling the mirror tilt and cradle rotation angles, the mirror can be controlled to point in different directions allowing the camera module including mirror assembly 1900 to capture different image capture areas.

From the above it should be appreciated the method of FIG. 2 can be implemented in a single camera device, e.g., a portable handheld camera or can be implemented in a distributed manner with the camera device capturing images and various image processing operations being performed using hardware, e.g., a personal computer or network node, to perform one or more image processing operations outside the camera device.

The methods and apparatus of the present invention can be used with a wide range of camera devices and camera modules which are also sometimes referred to as optical chains. U.S. patent application Ser. No. 14/327,514 which was filed on Jul. 9, 2014 describes various camera modules and camera devices which can be used with the methods described herein and is hereby expressly incorporated by reference in its entirety.

The techniques of various embodiments may be implemented using software, hardware and/or a combination of software and hardware. Various embodiments are directed to apparatus, e.g., a camera device, an image processing device or a system. Various embodiments are also directed to methods, e.g., a method of generating combined pixel values from sets of input pixel values corresponding to an image area where each set of pixel values may be provided by a different optical chain module. Various embodiments are also directed to machine, e.g., computer, readable medium, e.g., ROM, RAM, CDs, hard discs, etc., which include machine readable instructions for controlling a machine, e.g., camera device, processor or image processing system, to implement one or more steps of one or more of the methods described in the present application.

In various embodiments apparatus described herein are implemented using one or more modules to perform the steps corresponding to one or more methods. Thus, in some embodiments various features are implemented using modules. Such modules may be implemented using software, hardware or a combination of software and hardware. Optical chain modules as should be appreciated include at least some hardware elements such as an image sensor and are therefore normally not implementable purely in software while other modules may be implemented fully in software. In some embodiments in which the modules are implemented in hardware, the modules are implemented as circuits, e.g., of a processor and/or as a combination of hardware elements such as lenses, filters and an image sensor. In many or all of the above described embodiments, methods and/or method steps can, and in some embodiments are, implemented using computer executable instructions, such as software, included in a computer readable medium, e.g., a non-transitory computer readable medium, such as a memory device, e.g., RAM, floppy disk, etc. which when executed control a machine, e.g., general purpose computer or processor, with or without additional hardware, to implement all or portions of the above described methods. Accordingly, among other things, various embodiments are directed to a computer readable medium including computer executable instructions for causing a machine, e.g., processor or computer system, to perform one or more of the steps of the above-described method(s).

Some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a camera device, an image processing device or other type of system. In some embodiments the image processing device is a portable device including a camera, e.g., a cell phone including a camera with a processor that implements the method.

In some embodiments modules are implemented using software, in other embodiments modules are implemented in hardware, in still other embodiments the modules are implemented using a combination of hardware and/or software.

Numerous additional variations on the methods and apparatus of the various embodiments described above will be apparent to those skilled in the art in view of the above description. Such variations are to be considered within the scope of the invention.

What is claimed is:

1. A method of operating a camera device comprising:
receiving user input indicating an object of interest, said object of interest being at a first position when user input indicating the object of interest is received;
identifying, based on the received user input, a first set of one or more first type camera modules which should be used to capture an image of the object of interest, said identified first set of one or more first type camera modules including a first camera module including a first movable mirror, said step of identifying a first set of one or more first type camera modules including identifying said first camera module based on the field of view of said first camera module, said first camera module having a field of view which includes said first position or which can be adjusted to include said first position;
tracking the position of the object of interest;
controlling a position of said first moveable mirror of said first camera module to change based on the tracked position of the object of interest, controlling the position of said first moveable mirror including changing an angle of inclination of said first moveable mirror and rotating said first moveable mirror; and
operating the first camera module to capture an image of the object of interest; and
wherein said first set of one or more first type camera modules includes a plurality of first type camera modules, each camera module of said plurality of first type camera modules being a camera module with a single moveable mirror that can be rotated and tilted.

2. The method of claim 1, further comprising:
receiving user input indicating a size of an area surrounding the object of interest to be captured; and
wherein identifying, based on the received user input, said first set of one or more first type camera modules which should be used to capture an image of the object of interest is further based on the size of the area surrounding the object of interest to be captured.

3. A method of operating a camera device comprising:
receiving user input indicating an object of interest;
identifying, based on the received user input, a first set of one or more first type camera modules which should be used to capture an image of the object of interest, said identified first set of one or more first type camera modules including a first camera module including a first movable mirror;
tracking the position of the object of interest;
controlling a position of said first moveable mirror of said first camera module to change based on the tracked position of the object of interest, controlling the position of said first moveable mirror including changing an angle of inclination of said first moveable mirror and rotating said first moveable mirror; and
operating the first camera module to capture an image of the object of interest;
operating a second type camera module having a first field of view which is larger than a field of view of said first type camera modules to capture images of a scene area;
detecting, based on images captured by the second type camera module a move of the object of interest from the first position to a new position; and
based on the new position, identifying a second set of one or more first type camera modules to be used to capture an image of the object of interest.

4. The method of claim 3, wherein identifying said second set of one or more first type camera modules includes identifying one or more first type camera modules having a field of view including the new position of the object of interest said second set of one or more first type camera modules including a second camera module.

5. The method of claim 4, further comprising:
controlling a position of a second moveable mirror, said second moveable mirror being a moveable mirror in said second camera module, controlling the position of the second moveable mirror including moving the second moveable mirror based on the tracked change in the position of the object of interest to keep the object of interest in the field of view of said second camera module for a period of time.

6. The method of claim 5, wherein controlling the position of the second moveable mirror includes changing an angle of inclination of said second moveable mirror.

7. The method of claim 5, wherein controlling the position of the second moveable mirror includes changing an angle of inclination of said second moveable mirror and rotating said second moveable mirror to point the second moveable mirror in a different direction than a direction used to capture an image of the object of interest at the start of said period of time.

8. A camera device comprising:
a plurality of camera modules;
a module configured to receive user input indicating an object of interest, said object of interest being at a first position when user input indicating the object of interest is received;
a module configured to identify, based on the received user input, a first set of one or more first type camera modules which should be used to capture an image of the object of interest, said identified first set of one or more first type camera modules including a first camera module including a first moveable mirror, said module configured to identify said first set of one or more first type camera modules including a module configured to identify said first camera module based on the field of view of the first camera module, said first camera module having a field of view which includes said first position or which can be adjusted to include said first position;
a module configured to track the position of the object of interest;
a module configured to control a position of said first moveable mirror of said first camera module to change based on the tracked position of the object of interest, controlling the position of the first moveable mirror including changing an angle of inclination of said first moveable mirror and rotating said first moveable mirror; and
a module configured to control the first camera module to capture an image of the object of interest; and
wherein said first set of one or more first type camera modules includes a plurality of first type camera modules, each camera module of said plurality of first type camera modules being a camera module with a single moveable mirror that can be rotated and tilted.

9. The camera device of claim 8, further comprising:
a module configured to receive user input indicating a size of an area surrounding the object of interest to be captured; and
wherein said module configured to identify said first set of one or more first type camera modules which should be used to capture an image of the object of interest is further configured to base the identification on the size of the area surrounding the object of interest to be captured.

10. A camera device comprising:
a plurality of camera modules;
a module configured to receive user input indicating an object of interest, said object of interest being at a first position when user input indicating the object of interest is received;
a module configured to identify, based on the received user input, a first set of one or more first type camera modules which should be used to capture an image of the object of interest, said identified first set of one or more first type camera modules including a first camera module including a first moveable mirror, said module configured to identify said first set of one or more first type camera modules including a module configured to identify said first camera module based on the field of view of the first camera module, said first camera module having a field of view which includes said first position or which can be adjusted to include said first position;
a module configured to track the position of the object of interest;
a module configured to control a position of said first moveable mirror of said first camera module to change based on the tracked position of the object of interest, controlling the position of the first moveable mirror including changing an angle of inclination of said first moveable mirror and rotating said first moveable mirror; and
a module configured to control the first camera module to capture an image of the object of interest;

a module configured to control a second type camera module, having a first field of view which is larger than a field of view of said first type camera modules, to capture images of a scene area;

a module configured to detect, based on images captured by the second type camera module a move of the object of interest from the first position to a new position; and a module configured to identify, based on the new position, a second set of one or more first type camera modules to be used to capture an image of the object of interest.

11. The camera device of claim 10, wherein said module configured to identify said second set of one or more first type camera modules includes:

a module configured to identify one or more first type camera modules having a field of view including the new position of the object of interest, said identified one or more first type camera modules having a field of view including the new position of the object of interest including a second camera module; and a module configured to include said second camera module in said second set of one or more first type camera modules.

12. The camera device of claim 11, further comprising:

a module configured control a position of a second moveable mirror, said second moveable mirror being a moveable mirror in said second camera module, to move based on the tracked change in the position of the object of interest to keep the object of interest in the field of view of said second camera module for a period of time.

13. The camera device of claim 12, wherein said module configured to control the position of the second moveable mirror includes:

a module configured to change an angle of inclination of said second moveable mirror.

14. The camera device of claim 12, wherein said module configured to control the position of the second moveable mirror includes:

a module configured to change an angle of inclination of said second moveable mirror and a rotation of said second moveable mirror to point the second moveable mirror in a different direction than a direction used to capture an image of the object of interest at the start of the period of time.

15. A non-transitory machine readable medium including processor executable instructions which when executed by a processor of a camera device, control the camera device to perform the steps of:

receiving user input indicating an object of interest;

identifying, based on the received user input, a first set of one or more first type camera modules which should be used to capture an image of the object of interest, said identified first set of one or more first type camera modules including a first camera module including a first movable mirror;

tracking the position of the object of interest;

controlling a position of said first moveable mirror of said first camera module to change based on the tracked position of the object of interest, controlling the position of said first moveable mirror including changing an angle of inclination of said first moveable mirror and rotating said first moveable mirror; and operating the first camera module to capture an image of the object of interest;

operating a second type camera module having a first field of view which is larger than a field of view of said first type camera modules to capture images of a scene area;

detecting, based on images captured by the second type camera module a move of the object of interest from the first position to a new position; and identifying, based on the new position, a second set of one or more first type camera modules to be used to capture an image of the object of interest.

* * * * *